US008885134B2

(12) United States Patent
Nagasawa

(10) Patent No.: US 8,885,134 B2
(45) Date of Patent: Nov. 11, 2014

(54) LIQUID CRYSTAL DEVICE AND ELECTRONIC APPARATUS

(71) Applicant: Seiko Epson Corporation, Tokyo (JP)

(72) Inventor: Hitoya Nagasawa, Suwa (JP)

(73) Assignee: Seiko Epson Corporation, Tokyo (JP)

(*) Notice: Subject to any disclaimer, the term of this patent is extended or adjusted under 35 U.S.C. 154(b) by 107 days.

(21) Appl. No.: 13/681,199

(22) Filed: Nov. 19, 2012

(65) Prior Publication Data

US 2013/0128210 A1   May 23, 2013

(30) Foreign Application Priority Data

Nov. 22, 2011 (JP) ................... 2011-254706

(51) Int. Cl.
*G02F 1/1345* (2006.01)
*G02F 1/1339* (2006.01)
*G02F 1/1333* (2006.01)

(52) U.S. Cl.
CPC .......... *G02F 1/13452* (2013.01); *G02F 1/1339* (2013.01); *G02F 1/1345* (2013.01); *G02F 2001/133337* (2013.01); *G02F 2001/133388* (2013.01)
USPC ........... 349/151; 348/571; 345/100; 345/103; 345/87

(58) Field of Classification Search
CPC ................. G02F 2201/44; G02F 1/133707
USPC ............. 349/151; 348/571; 345/100, 103, 87
See application file for complete search history.

(56) References Cited

U.S. PATENT DOCUMENTS

| 2002/0154104 | A1* | 10/2002 | Inoue et al. | 345/204 |
| 2005/0230757 | A1* | 10/2005 | Nagasawa et al. | 257/355 |
| 2008/0055529 | A1* | 3/2008 | Shirasaka et al. | 349/143 |
| 2008/0137022 | A1* | 6/2008 | Komeno et al. | 349/153 |
| 2010/0225632 | A1* | 9/2010 | Ma et al. | 345/211 |
| 2011/0291977 | A1* | 12/2011 | Moriwaki | 345/173 |
| 2012/0075260 | A1* | 3/2012 | Saito et al. | 345/204 |

FOREIGN PATENT DOCUMENTS

JP   2002-196355 A   7/2002

* cited by examiner

*Primary Examiner* — Edward Glick
*Assistant Examiner* — Sang V Nguyen
(74) *Attorney, Agent, or Firm* — ALG Intellectual Property, LLC

(57) ABSTRACT

A liquid crystal device includes a positive potential connection line as a first connection line layer to which a first potential lower than a common potential is applied, between a pixel area and a seal member in the plan view, and a peripheral electrode as a second connection line layer that is provided between the positive potential connection line and a liquid crystal layer, is provided to overlap with at least a part of the positive potential connection line in the plan view, and to which a second potential higher than the common potential is applied.

18 Claims, 14 Drawing Sheets

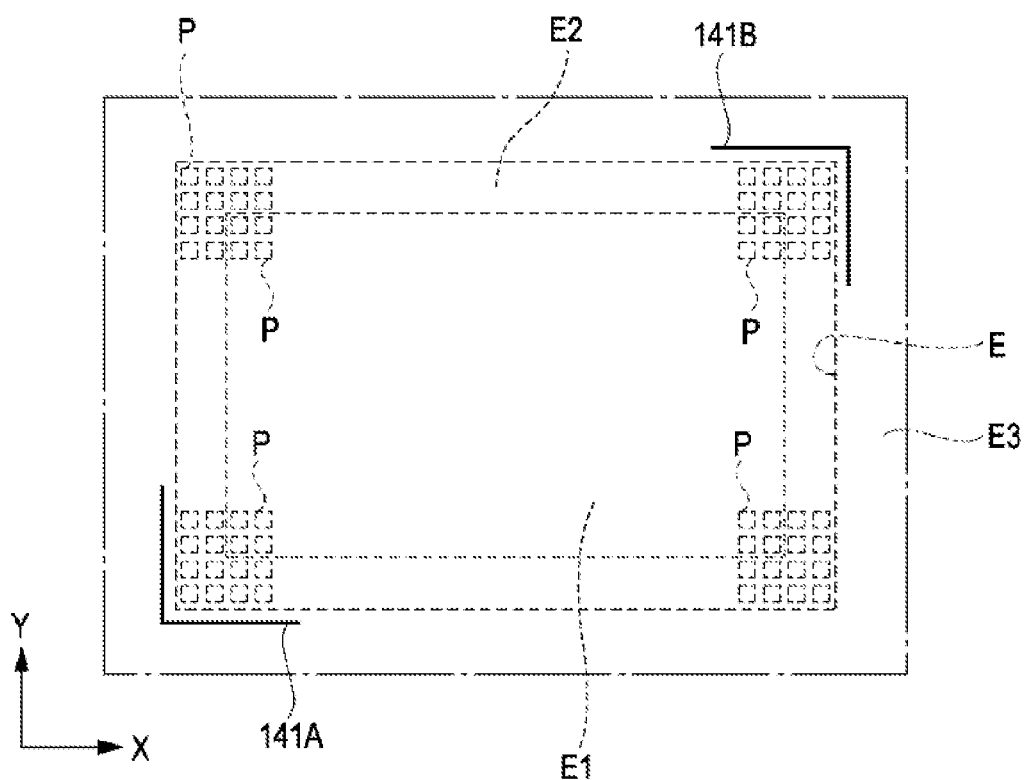

LIQUID CRYSTAL DEVICE AND ELECTRONIC APPARATUS

BACKGROUND

1. Technical Field

The present invention relates to a liquid crystal device and an electronic apparatus provided with the liquid crystal device.

2. Related Art

A liquid crystal device has a liquid crystal layer having a positive or negative dielectric anisotropy interposed between a pair of substrates. For example, each electrode is formed on the pair of substrates, a driving voltage is applied between the electrodes with the liquid crystal layer interposed therebetween to change an alignment state of liquid crystal molecules constituting the liquid crystal layer by an electric field effect, and thus it is possible to optically modulate light input to the liquid crystal layer on the basis of an image signal. The liquid crystal layer has a thickness of, for example, several μm, and a high insulating property. However, when ionic impurities are included in the liquid crystal layer, the insulating property is decreased in the whole liquid crystal layer or parts thereof, and thus, a desired driving voltage is not applied. Accordingly, a display defect such as display unevenness or burn-in may occur.

To improve the display defects caused by ionic impurities, for example, in JP-A-2002-196355, a liquid crystal display device provided with an ionic impurity adsorption electrode on the outside of a display area in a seal member of one substrate of a pair of substrates is disclosed.

In JP-A-2002-196355, an example is disclosed, in which the ionic impurity adsorption electrode is disposed on an active matrix substrate provided with a plurality of pixel electrodes and thin film transistors connected to the pixel electrodes, respectively, a positive or negative direct-current voltage with respect to a common voltage is applied, and ionic impurities are adsorbed.

In addition, an example is disclosed, in which the ionic impurity adsorption electrode is electrically connected to a data signal line, a scanning signal line, or an auxiliary capacitance line.

On the outside of the display area of the active matrix substrate disclosed in JP-A-2002-196355, a potential-applied connection line may be disposed in addition to a data signal line, a scanning signal line, and an auxiliary capacitance line. Accordingly, it is necessary to consider a relative positional relationship between the potential-applied connection line and the ionic impurity adsorption electrode. For example, when the potential-applied connection line is closer to the pixel electrode than the ionic impurity adsorption electrode, it is thought that ionic impurities in liquid crystal are eccentrically located in the display area of attracting the ionic impurities by an electric field generated between the connection line and the pixel electrode, and the ionic impurities either cannot be adsorbed at all or cannot be adsorbed efficiently even when potential is applied to the ionic impurity adsorption electrode. That is, even when the ionic impurity adsorption electrode is disposed on the outside of the display area of the active matrix substrate, there is a problem that it may be difficult to obtain a desired effect.

SUMMARY

The invention can be realized in the following forms or application examples.

APPLICATION EXAMPLE 1

According to Application Example 1, there is provided a liquid crystal device including: a first substrate that is provided with a pixel area where a plurality of pixel electrodes are arranged on one face side thereof; a second substrate that is provided with a common electrode to which a common potential is applied; a seal member that bonds the first substrate and the second substrate; and a liquid crystal layer that is kept in an area surrounded by the seal member between the first substrate and the second substrate, wherein the first substrate includes a first connection line layer that is provided between the base material of the first substrate and the liquid crystal layer, which are between the pixel area and the seal member in a plan view, and to which a first potential lower than the common potential is applied, and a second connection line layer that is provided between the first connection line layer and the liquid crystal layer and is provided to overlap with at least a part of the first connection line layer in the plan view, and to which a second potential higher than the common potential is applied.

With such a configuration, a first electric field is generated between the pixel electrodes and the first connection line layer to which the first potential lower than the common potential is applied. In addition, a second electric field is generated between the pixel electrodes and the second connection line layer to which the second potential higher than the common potential of the first substrate is applied. The direction of the second electric field with respect to the direction of the first electric field is a reverse direction, the second connection line layer is provided to overlap with at least a part of the first connection line layer in the plan view, and thus the first electric field generated between the first connection line layer and the pixel electrode is weakened. Accordingly, the positive ionic impurities in the liquid crystal layer attracted by the first electric field generated between the first connection line layer and the pixel electrodes are reversed by the second electric field generated between the second connection line layer and the pixel electrodes, and may be dispersed in the liquid crystal layer. Accordingly, a display defect such as display unevenness or burn-in caused by partial eccentric location of positive ionic impurities is reduced, and it is possible to provide the liquid crystal device having high reliability with a stable display state kept.

APPLICATION EXAMPLE 2

According to Application Example 2, there is provided a liquid crystal device including: a first substrate that is provided with a pixel area where a plurality of pixel electrodes are arranged on one face side thereof; a second substrate that is provided with a common electrode to which a common potential is applied; a seal member that bonds the first substrate and the second substrate; and a liquid crystal layer that is kept in an area surrounded by the seal member between the first substrate and the second substrate, wherein the first substrate includes a first connection line layer that is provided between the base material of the first substrate and the liquid crystal layer, which are between the pixel area and the seal member in a plan view, and to which a first potential higher than the common potential is applied, and a second connection line layer that is provided between the first connection line layer and the liquid crystal layer and is provided to overlap with at least a part of the first connection line layer in the plan view, and to which a second potential lower than the common potential is applied.

With such a configuration, a first electric field is generated between the pixel electrodes and the first connection line layer to which the first potential higher than the common potential is applied. In addition, a second electric field is generated between the pixel electrodes and the second connection line layer to which the second potential lower than the common potential of the first substrate is applied. The direction of the second electric field with respect to the direction of the first electric field is a reverse direction, the second connection line layer is provided to overlap with at least a part of the first connection line layer in the plan view, and thus the first electric field generated between the first connection line layer and the pixel electrode is weakened. Accordingly, the negative ionic impurities in the liquid crystal layer attracted by the first electric field generated between the first connection line layer and the pixel electrodes are reversed by the second electric field generated between the second connection line layer and the pixel electrodes, and may be dispersed in the liquid crystal layer. Accordingly, a display defect such as display unevenness or burn-in caused by partial eccentric location of negative ionic impurities is reduced, and it is possible to provide the liquid crystal device having high reliability with a stable display state kept.

APPLICATION EXAMPLE 3

In the liquid crystal device, the first substrate may include transistors corresponding to the pixel electrodes, scanning lines that are electrically connected to the transistors, and a scanning line driving circuit that supplies a driving signal to the scanning lines, and the first connection line layer may be a positive potential connection line for supplying a positive potential to the scanning line driving circuit.

With such a configuration, the positive potential connection line for supplying the positive potential to the scanning line driving circuit may be, for example, a connection line for supplying a reference fixed potential lower than the common potential such as a GND potential, or a connection line for supplying a driving fixed potential higher than the common potential. Positive or negative ionic impurities attracted by the first electric field between such a positive potential connection line and the pixel electrode are reversed by the second electric field between the pixel electrode and the second connection line layer, and may be dispersed in the liquid crystal.

APPLICATION EXAMPLE 4

In the liquid crystal device, the first substrate may include a third connection line layer that is provided between the base material of the first substrate and the liquid crystal layer, is provided adjacent to the pixel electrodes between the second connection line layer and the pixel electrodes in the plan view, and to which the common potential is applied.

Alternating current potential with different polarities is applied to the pixel electrodes with the common potential considered as a reference, and on average, the potential is substantially the common potential. With such a configuration, the third connection line layer to which the common potential is applied is provided between the second connection line layer and the pixel electrodes, and thus the intensity of the second electric field generated between the pixel electrodes and the second connection line layer is increased as compared with a case where the third connection line layer is not provided. That is, it is possible to more effectively disperse the positive or negative ionic impurities which become a factor for causing display defects in the liquid crystal layer.

APPLICATION EXAMPLE 5

In the liquid crystal device, the third connection line layer may be provided between the first connection line layer and the second connection line layer, and may be disposed to overlap with at least a part of an area of the first connection line layer which does not overlap with the second connection line layer in the plan view.

With such a configuration, it is possible to block the first electric field that extracts the positive or negative ionic impurities and is generated between the pixel electrodes and the first connection line layer by the third connection line layer.

APPLICATION EXAMPLE 6

In the liquid crystal device, the second connection line layer may overlap to cover the first connection line layer in the plan view.

Even according to this application example, it is possible to reliably block the first electric field that extracts the positive or negative ionic impurities and is generated between the pixel electrodes and the first connection line layer by the second connection line layer.

APPLICATION EXAMPLE 7

In the liquid crystal device, the second connection line layer may be formed in the same connection line layer as the pixel electrode.

With such a configuration, the second connection line layer is formed in the same layer as the pixel electrodes, and thus it is possible to raise the intensity of the second electric field generated between the pixel electrodes and the second connection line layer as compared with a case where it is not formed in the same layer.

APPLICATION EXAMPLE 8

In the liquid crystal device, the second connection line layer may be disposed at a part along at least corner portions of the pixel area.

With such a configuration, it is possible to reduce the positive or negative ionic impurities extracted to the first connection line layer side by ON-OFF of the liquid crystal layer from being eccentrically located at the corner portions of the pixel area.

APPLICATION EXAMPLE 9

In the liquid crystal device, the first substrate may include a fourth connection line layer to which the common potential is applied, between the second connection line layer and the pixel electrodes in the plan view in the same layer as the pixel electrodes.

With such a configuration, it is possible to further raise the intensity of the second electric field generated between the pixel electrodes and the second connection line layer. That is, it is possible to disperse the positive or negative ionic impurities extracted to the first connection line layer side, in the liquid crystal.

APPLICATION EXAMPLE 10

In the liquid crystal device, the first substrate may include a fifth connection line layer to which the common potential is applied, between the second connection line layer and the seal member in the plan view in the same layer as the pixel electrodes.

With such a configuration, a third electric field is generated between the second connection line layer and the fifth connection line layer. By the third electric field, it is possible to reduce the positive or negative ionic impurities included in the seal member from being diffused in the liquid crystal on the pixel area side.

APPLICATION EXAMPLE 11

In the liquid crystal device, the first substrate may include a fourth connection line layer to which the common potential is applied, between the second connection line layer and the pixel electrodes in the plan view, and a fifth connection line layer to which the common potential is applied, between the second connection line layer and the seal member in the plan view.

With such a configuration, it is possible to disperse the positive or negative ionic impurities extracted to the first connection line layer side, in the liquid crystal, and it is possible to reduce that the positive or negative ionic impurities included in the seal member are diffused in the liquid crystal on the pixel area side. That is, it is possible to provide the liquid crystal device in which the occurrence of display defects caused by the positive or negative ionic impurities is further reduced.

APPLICATION EXAMPLE 12

In the liquid crystal device, the second potential may be equal to or lower than a potential in which a ratio of change is 50% when a ratio of change of transmittance at the time of ON-OFF switching in the liquid crystal layer is 100% considering the common potential as a reference potential.

With such a configuration, even when the second potential is applied to the second connection line layer, it is possible to avoid that the alignment of liquid crystal molecules in the liquid crystal layer is disturbed by the electric field generated between the second connection line layer and the pixel electrode or between the second connection line layer and the common electrode, and, for example, the occurrence of a defect such as light leakage in a normally-black mode.

APPLICATION EXAMPLE 13

In the liquid crystal device, the second potential may be equal to or lower than a potential in which a ratio of change is 10% when a ratio of change of transmittance at the ON-OFF time in the liquid crystal layer is 100% considering the common potential as a reference potential.

With such a configuration, even when the second potential is applied to the second connection line layer, it is possible to more reliably avoid that the alignment of liquid crystal molecules in the liquid crystal layer is disturbed by the electric field generated between the second connection line layer and the pixel electrode or between the second connection line layer and the common electrode, for example, a defect such as light leakage in a normally-black mode occurs.

APPLICATION EXAMPLE 14

According to Application Example 13, there is provided a liquid crystal device including: a first substrate that is provided with a pixel area where a plurality of pixel electrodes are arranged on one face side thereof; a second substrate that is provided with a common electrode to which a common potential is applied; a seal member that bonds the first substrate and the second substrate; and a liquid crystal layer that is kept in an area surrounded by the seal member between the first substrate and the second substrate, wherein the first substrate includes a first connection line layer that is provided between the base material of the first substrate and the liquid crystal layer, which are between the pixel area and the seal member in a plan view, and to which a first potential lower than the common potential is applied, and a second connection line layer that is provided between the first connection line layer and the liquid crystal layer and is provided to overlap with at least a part of the first connection line layer in the plan view, and is electrically connected to the first connection line layer.

With such a configuration, electric field reversing the negative ionic impurities is generated with the pixel electrodes through the second connection line layer electrically connected to the first connection line layer to which the first potential lower than the common potential is applied. That is, it is not necessary to apply the potential lower than the common potential from the outside to the second connection line layer, and it is possible to reduce the display defect caused by the eccentric location of the negative ionic impurities by applying the potential to the second connection line layer using the first connection line layer in the liquid crystal device.

APPLICATION EXAMPLE 15

According to Application Example 14, there is provided a liquid crystal device including: a first substrate that is provided with a pixel area where a plurality of pixel electrodes are arranged on one face side thereof; a second substrate that is provided with a common electrode to which a common potential is applied; a seal member that bonds the first substrate and the second substrate; and a liquid crystal layer that is kept in an area surrounded by the seal member between the first substrate and the second substrate, wherein the first substrate includes a first connection line layer that is provided between the base material of the first substrate and the liquid crystal layer between the pixel area and the seal member in the plan view, and to which a first potential higher than the common potential is applied, and a second connection line layer that is provided between the first connection line layer and the liquid crystal layer and is provided to overlap with at least a part of the first connection line layer in the plan view, and is electrically connected to the first connection line layer.

With such a configuration, electric field reversing the positive ionic impurities is generated with the pixel electrode through the second connection line layer electrically connected to the first connection line layer to which the first potential higher than the common potential is applied. That is, it is not necessary to apply the potential lower than the common potential from the outside to the second connection line layer, and it is possible to reduce display defects caused by the eccentric location of the positive ionic impurities by applying the potential to the second connection line layer using the first connection line layer in the liquid crystal device.

APPLICATION EXAMPLE 16

In the liquid crystal device, the first substrate includes transistors corresponding to the pixel electrodes, scanning lines that are electrically connected to the transistors, and a scanning line driving circuit that supplies a driving signal to the scanning lines, and the first connection line layer is a positive potential connection line for supplying a positive potential to the scanning line driving circuit.

With such a configuration, it is possible to apply the potential lower or higher than the common potential to the second connection line layer using the positive potential connection line for supplying the reference potential to the scanning line driving circuit or the positive potential connection line for supplying the driving potential.

APPLICATION EXAMPLE 17

According to Application Example 1, there is provided an electronic apparatus including the liquid crystal device according to the application examples.

With such a configuration, it is possible to provide the electronic apparatus in which display defects caused by the eccentric location of the positive or negative ionic impurities are reduced and which has high reliability.

BRIEF DESCRIPTION OF THE DRAWINGS

The invention will be described with reference to the accompanying drawings, wherein like numbers reference like elements.

FIG. 15 is a schematic plan view illustrating disposition of a peripheral electrode of a modification example.

DESCRIPTION OF EXEMPLARY EMBODIMENTS

Hereinafter, embodiments of the invention will be described with reference to the drawings. In addition, the drawings used are shown by appropriate enlargement or contraction such that the described parts are recognizable.

In addition, in the following embodiments, for example, a case of the description "on the substrate" means a case of disposition on the substrate so as to contact the substrate, a case of disposition on the substrate through another component, or a case of disposition with a part coming in contact on the substrate and disposition with a part thereof on the substrate through another component.

First Embodiment

In the embodiment, an active matrix type liquid crystal device provided with thin film transistors as switching elements of pixels will be described by way of example. The liquid crystal device may be appropriately used, for example, as an optical modulation element (a liquid crystal light valve) of a projection type display device (a liquid crystal projector) to be described later.

Liquid Crystal Device

Figure 1A:
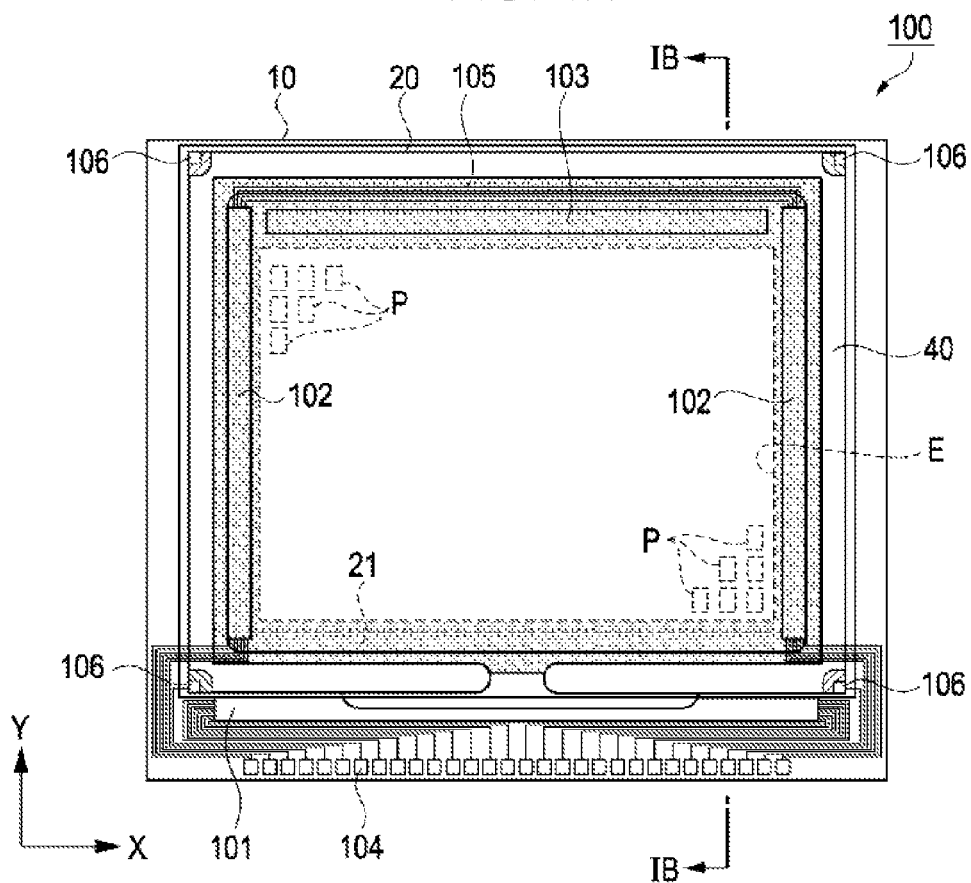
FIG. 1A is a schematic plan view illustrating a configuration of a liquid crystal device.
Figure 2:
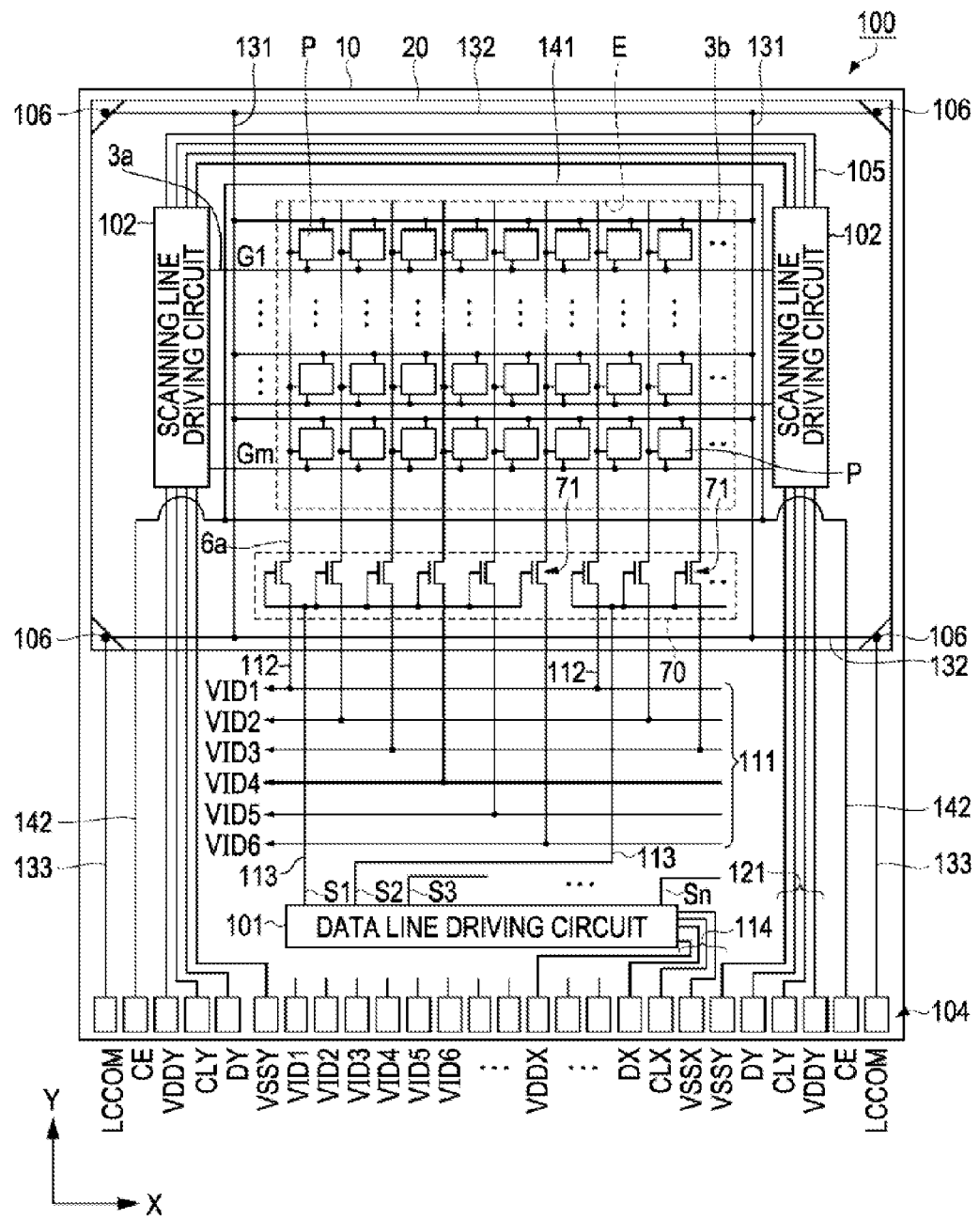
FIG. 2 is a circuit diagram illustrating an electrical configuration of the liquid crystal device.
Figure 3:
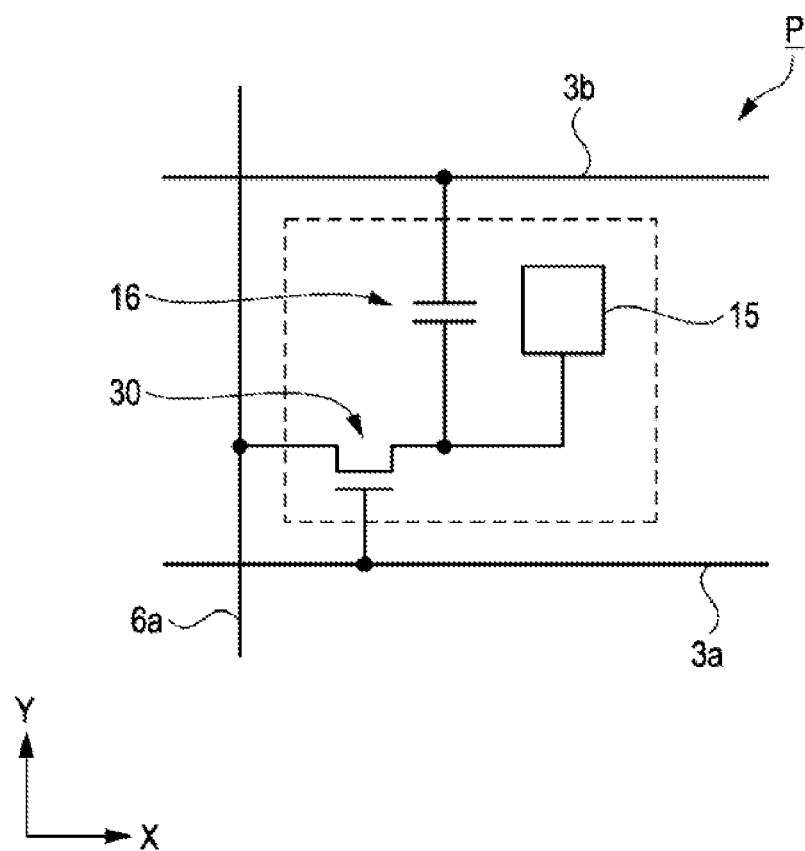
FIG. 3 is an equivalent circuit diagram illustrating an electrical configuration of a pixel.
Figure 4:
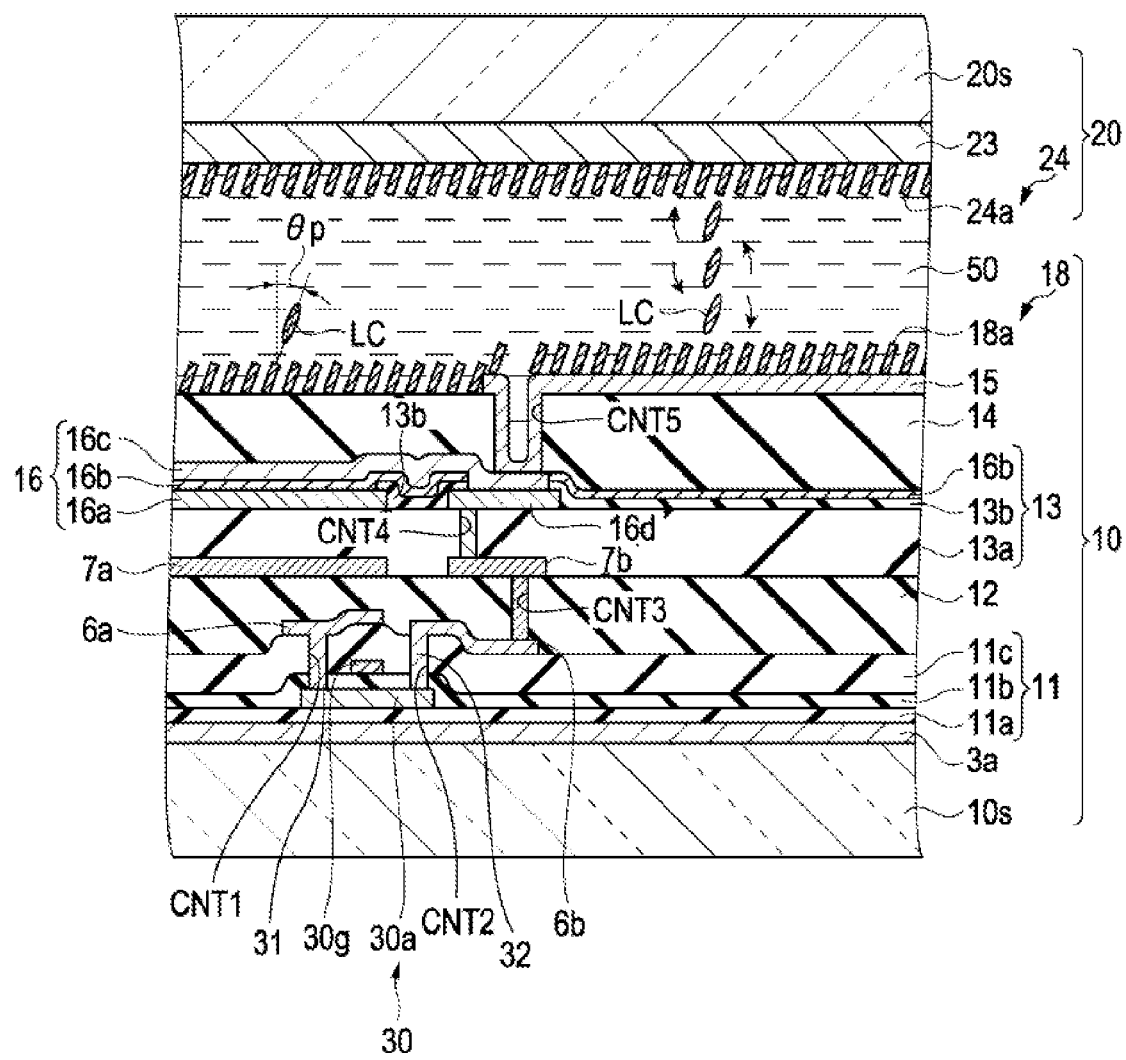
FIG. 4 is a schematic cross-sectional view illustrating a structure of a pixel in the liquid crystal device.

First, a liquid crystal device of the embodiment will be described with reference to FIG. 1A to FIG. 3. FIG. 1A is a schematic plan view illustrating a configuration of the liquid crystal device, FIG. 1B is a schematic cross-sectional view illustrating a structure of the liquid crystal device taken along the line IB-IB of FIG. 1A, FIG. 2 is a circuit diagram illustrating an electrical configuration of the liquid crystal device, FIG. 3 is an equivalent circuit diagram illustrating an electrical configuration of a pixel, and FIG. 4 is a schematic cross-sectional view illustrating a structure of a pixel in the liquid crystal device.

Figure 1B:
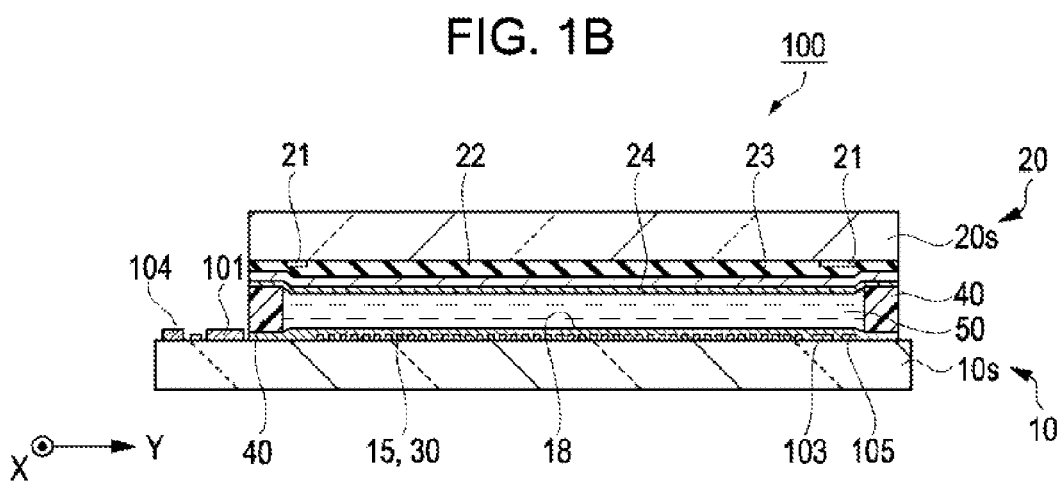
FIG. 1B is a schematic cross-sectional view illustrating a structure of the liquid crystal device taken along the line IA-IA.

As shown in FIG. 1A and FIG. 1B, the liquid crystal device 100 of the embodiment includes an element substrate 10 as a first substrate and an opposed substrate 20 as a second substrate, which are opposed to each other, and a liquid crystal layer 50 interposed between the pair of substrates. In the element substrate 10 and the opposed substrate 20, for example, a quartz substrate or a glass substrate which is transparent is used as base materials 10s and 20s.

The element substrate 10 is larger than the opposed substrate 20, both substrates are bonded through a seal member 40 disposed along an outer periphery of the opposed substrate 20, and liquid crystal having positive or negative dielectric anisotropy at a space therebetween is enclosed to configure the liquid crystal layer 50. The seal member 40 employs, for example, an adhesive such as thermosetting or ultraviolet curable epoxy resin. The seal member 40 is provided with a spacer (not shown) for keeping a gap between the pair of substrates regular.

The seal member 40 is provided therein with a pixel area E where a plurality of pixels P are arranged. In addition, a closeout portion 21 surrounding the pixel area E is provided between the seal member 40 and the pixel area E. The closeout portion 21 is formed of, for example, a light shielding metal or a metal oxide. In addition, the pixel area E may include dummy pixels disposed to surround the plurality of pixels P in addition to the plurality of pixels P contributing to display. In addition, although not shown in FIG. 1A and FIG. 1B, a light shielding portion (a black matrix: BM) partitioning the plurality of pixels P in the plan view in the pixel area E is provided on the opposed substrate 20.

A data line driving circuit 101 is provided between the seal member 40 along one side portion of the element substrate 10 and the one side portion. In addition, an examination circuit 103 is provided between the seal member 40 along the other side portion opposed to the one side portion and the pixel area E. In addition, scanning line driving circuits 102 are provided between the seal member 40 along other two side portions perpendicular to the one side portion and opposed to each other and the pixel area E. A plurality of connection lines 105 connecting two scanning line driving circuit 102 are provided between the seal member 40 along the other side portion opposed to the one side and the examination circuit 103.

The connection lines connected to the data line driving circuit 101 and the scanning line driving circuits 102 are connected to a plurality of external connection terminals 104 arranged along the one side portion. Hereinafter, a direction along the one side portion is an X direction, and a direction along other two side portions perpendicular to the one side portion and opposed to each other is a Y direction. In addition, disposition of the examination circuit 103 is not limited thereto, and the examination circuit 103 may be provided between the seal member 40 along the data line driving circuit 101 and the pixel area E.

As shown in FIG. 1B, on the surface on the liquid crystal layer 50 side of the element substrate 10, the translucent pixel electrodes 15 provided for each pixel P, thin film transistors (hereinafter, referred to as TFT) 30 that are switching elements, signal connection lines, and an alignment film 18 that covers them are formed. In addition, a light shield structure of preventing light from being input to a semiconductor layer in the TFT 30 such that a switching operation becomes unstable is employed. The element substrate 10 as the first substrate in the invention includes at least the base material 10s, the pixel electrode 15 formed on the base material 10s, the TFT 30, the signal connection line, and the alignment film 18.

On the surface on the liquid crystal layer 50 side of the opposed substrate 20, the closeout portion 21, a planarization layer 22 that is formed to cover it, the common electrode 23 that is provided to cover the planarization layer 22, and the alignment film 24 that covers the common electrode 23 are provided. The opposed substrate 20 as the second substrate in the invention includes at least the base material 20s, the closeout portion 21 that is formed on the base material 20s, the common electrode 23, and the alignment film 24.

The closeout portion 21 surrounds the pixel area E as shown in FIG. 1A, and is provided at a position where the scanning line driving circuit 102 and the examination circuit 103 are overlapped in the plan view. Accordingly, the light input from the opposed substrate 20 side to the peripheral circuit including such a driving circuit is shielded, and the peripheral circuit is prevented from being erroneously operated by the light. In addition, unnecessary stray light is shielded so as not to be input to the pixel area E, and a high contrast in display of the pixel area E is secured.

The planarization layer 22 is formed of, for example, an inorganic material such as silicon oxide, has optical transparency, and is provided to cover the closeout portion 21. A method of forming such a planarization layer 22 may be, for example, a method of forming a film using a plasma CVD method.

The common electrode 23 is formed of, for example, a transparent conductive film such as ITO (Indium Tin Oxide), covers the planarization layer 22, and is electrically connected to the connection line on the element substrate 10 side through vertical electrical connection portions 106 provided at four corners of the opposed substrate 20 as shown in FIG. 1A.

The alignment film 18 covering the pixel electrode 15 and the alignment film 24 covering the common electrode 23 are selected on the basis of optical design of the liquid crystal device 100. For example, they may be an organic alignment film formed of an organic material such as polyimide by rubbing the surface thereof and performing a substantially horizontal alignment process on liquid crystal molecules having positive dielectric anisotropy, or an inorganic alignment film formed of an inorganic material such as SiOx (silicon oxide) using a vapor-phase growth method by performing a substantially vertical alignment process on the liquid crystal molecules having negative dielectric anisotropy. In the embodiment, the inorganic alignment film described above is employed as the alignment film 18 and the alignment film 24.

Such a liquid crystal device 100 is a transmission type, and employs an optical design of a normally white mode of a bright display at the non-driving time of the pixels P and a normally black mode of a dark display at the non-driving time. A polarization element is disposed and used on the incident side and the output side of the light according to the optical design. In the embodiment, the normally black mode is employed.

Next, an electrical configuration of the liquid crystal device 100 will be described with reference to FIG. 2 and FIG. 3.

As shown in FIG. 2, the liquid crystal device 100 includes driving circuits such as the data line driving circuit 101 formed in the peripheral area positioned around the pixel area E on the element substrate 10, the scanning line driving circuit 102, and a sampling circuit 70, and a plurality of external connection terminals 104. In addition, the liquid crystal device 100 has a plurality of pulling connection lines including a data line driving circuit connection line 114 for supplying power (VDDX, and VSSX) or a driving signal (DX, CLX, and the like) to the data line driving circuit 101, connected to the external connection terminal 104, a scanning line driving circuit connection line 121 for supplying power (VDDY, and VSSY) or a driving signal (DY, CLY, and the like) to the scanning line driving circuit 102, a plurality of image signal lines 111 for supplying image signals (VID1 to VID6) to the data line 6a through the sampling circuit 70, and the like.

An X clock signal CLX (and an inverse X clock signal CLX) and an X start pulse DX are supplied from the external circuit to the data line driving circuit 101 through the external connection terminal 104 and the data line driving circuit connection line 114. When the X start pulse DX is input, the data line driving circuit 101 sequentially generates selection signals S1, S2, . . . , Sn at the timing based on the X clock signal CLX (and the inverse X clock signal CLX), and outputs the selection signals to a plurality of selection signal supply lines 113.

A Y clock signal CLY (and an inverse Y clock signal CLY), and a Y start pulse signal DY are supplied from the external circuit to the scanning line driving circuit 102 through the external connection terminal 104 and the scanning line driving circuit connection line 121. The scanning line driving circuit 102 sequentially generates scanning signals G1, G2, . . . , Gm on the basis of the signals, and outputs the scanning signals to a plurality of scanning lines 3a.

The sampling circuit 70 includes a plurality of sampling transistors (hereinafter, referred to as S-TFT) 71 configured by an N channel type single channel type TFT or a complementary type TFT. The gates of the six S-TFTs 71 connected to six data lines 6a adjacent to each other, respectively, may be collected to one, and are connected to one selection signal supply line 113. That is, the selection signals S1, S2, . . . , Sn are supplied from the data line driving circuit 101, in which six S-TFT 71 are one unit (series). The sources of six S-TFT 71 constituting one unit (series) are connected to any one of six image signal lines 111 through the connection line 112. A drain of the S-TFTs 71 are connected to the data line 6a.

When the selection signals S1, S2, ..., Sn are input, the sampling circuit 70 sequentially supplies the image signals (VID1 to VID6) according to the selection signals S1, S2, ..., Sn to the data line 6a corresponding to six S-TFT 71 constituting one unit (series).

As shown in FIG. 2, the liquid crystal device 100 includes the plurality of pixels arranged in matrix, in the pixel area E occupying a center portion of the element substrate 10 as described above.

As shown in FIG. 3, each of the plurality of pixels P is provided with the pixel electrode 15, the TFT 30 for switching control of the pixel electrode 15, and a retentive capacitor 16. The data line 6a to which the image signals (VID1 to VID6) are supplied is electrically connected to the source of the TFT 30. The scanning line 3a to which the scanning signals G1, G2, ..., Gm are supplied is connected to the gate of the TFT 30. One-side electrodes of the pixel electrode 15 and the retentive capacitor 16 are connected to the drain of the TFT 30. The other electrode of the retentive capacitor 16 is connected to the capacitance line 3b disposed in parallel to the scanning line 3a.

The capacitance line 3b is drawn up to the outside of the pixel area E in the X direction as shown in FIG. 2, and both ends of the capacitance line 3b are electrically connected to a pair of connection lines 131 extending in the Y direction between the scanning line driving circuit 102 and the pixel area E. Each of the pair of connection lines 131 is electrically connected to a pair of connection lines 132 electrically connecting the vertical electrical connection portions 106 opposed in the X direction among the four vertical electrical connection portions 106 provided at the corner portions of the opposed substrate 20.

The pair of connection lines 132 are electrically connected to each other through the common electrode 23 of the opposed substrate 20 electrically connected to the vertical electric connection portion 106. In addition, the connection line 132 positioned on the external connection terminal 104 side of a pair of connection lines 132 is connected to a pulling connection line 133 connected to the external connection terminal 104 to which the common potential (LCCOM) is supplied. That is, the common potential (LCCOM) is applied to the capacitance line 3b.

The selection signals S1, S2, ..., Sn supplied to six S-TFT 71, which are one unit (series), of the sampling circuit 70 may be sequentially supplied in this order, and may be supplied for each series with respect to the S-TFT 71 corresponding to six data lines 6a adjacent to each other. In addition, as shown in FIG. 2, in the embodiment, the selection signals S1, S2, ..., Sn correspond to the image signals (VID1 to VID6) serial-parallel developed in six phases, and are supplied to each group (the series) in the group of six data lines 6a. The number of phase evolutions (that is, the number of series of serial-parallel evoluted image signals) of the image signals (VID1 to VID6) is not limited to six phases, for example, and image signals evoluted to a plurality of phases such as 9 phases, 12 phases, or 24 phases may be supplied to a group of data lines 6a in which a number corresponding to the number of evolutions is one group.

The scanning signals G1, G2, ..., Gm are sequentially applied from the scanning line driving circuit 102 to the scanning line 3a at a predetermined timing in pulse in this order. As described above, the pixel electrode 15 is electrically connected to the drain of the TFT 30, the TFT 30 is turned on during a predetermined period by the scanning signals G1, G2, ..., Gm, and the image signals (VID1 to VID6) supplied from the data lines 6a are written in the pixel electrode 15 at a predetermined timing.

In addition, to prevent the image signals (VID1 to VID6) kept in the pixels P from leaking, a retentive capacitor 16 is added in parallel to the liquid crystal capacitance formed between the pixel electrode 15 and the common electrode 23.

The image signals (VID1 to VID6) with a predetermined level written in the liquid crystal layer 50 (see FIG. 1B) through the pixel electrodes 15 are kept between the common electrodes 23 formed on the opposed substrate 20 during a predetermined period. In the liquid crystal layer 50, alignment or order of liquid crystal molecules is changed according to the level of the applied voltage, the light passing through the liquid crystal layer 50 is modulated, and gradation display is possible. In the normally white mode, transmittance with respect to incident light is decreased according to the voltage applied by a unit of each pixel P to be a dark display. In the normally black mode, transmittance with respect to incident light is increased according to the voltage applied by a unit of each pixel P to be a bright display. Overall, display light having a contrast corresponding to the image signals (VID1 to VID6) is emitted from the liquid crystal device 100 to perform display. In addition, the image signals (VID1 to VID6) are configured by combining a potential pulse having positive polarity and a potential pulse having negative polarity with respect to the common potential (LCCOM) to drive the liquid crystal layer 50 in an alternating current manner. The method of driving the liquid crystal device 100 described above is called a phase evolution driving method. In addition, the method of driving the liquid crystal device 100 is not limited to the phase evolution driving method.

Returning to FIG. 2, in the element substrate 10, the peripheral electrode 141 as the second connection line layer in the invention is provided to surround the pixel area E in the vicinity of the connection line 131 connected to the external connection terminal 104 to which the common potential (LCCOM) is supplied. The peripheral electrode 141 is connected to each of a pair of pulling connection lines 142 extending in the Y direction on both end sides in the X direction of the element substrate 10. Each of the pair of pulling connection lines 142 is connected to the external connection terminal 104 to which the second potential (CE) of the invention is supplied and is disposed between the external connection terminal 104 to which the common potential (LCCOM) is supplied and which is positioned on both end sides, and the external connection terminal 104 to which the driving potential (VDDY) as the first potential of the invention is supplied, in the plurality of external connection terminals 104 arranged in the X direction. Detailed disposition of the peripheral electrode 141 in the element substrate 10 will be described in an example to be described later.

Next, a structure in the pixel P of the liquid crystal device 100, and particularly, a detailed connection line structure of the element substrate 10 and an alignment state of the liquid crystal molecules will be described with reference to FIG. 4.

As shown in FIG. 4, first, the scanning line 3a is formed on the base material 10s of the element substrate 10.

The scanning line 3a may be, for example, a metal elemental substance including at least one metal Al (aluminum), Ti (titanium), Cr (chromium), W (tungsten), Ta (tantalum), and Mo (molybdenum), or the like, an alloy, a metal silicide, a polysilicide, a nitride, or a laminated body thereof, and has a light shielding property.

For example, a first insulating film (a base insulating film) 11a formed of silicon oxide is formed to cover the scanning line 3a, and a semiconductor layer 30a is formed on the first insulating film 11a in an island shape. The semiconductor layer 30a is formed of, for example, a polycrystalline silicon film, to which impurity ions are injected, and an LDD structure having a first source and drain area, a junction area, a channel area, a junction area, and a second source and drain area.

A second insulating film (a gate insulating film) 11b is formed to cover to the semiconductor layer 30a. In addition, a gate electrode 30g is formed at a position opposed to the channel area with the second insulating film 11b interposed therebetween.

A third insulating film 11c is formed to cover the gate electrode 30g and the second insulating film 11b, and two contact holes CNT1 and CNT2 passing through the second insulating film 11b and the third insulating film 11c are formed at a position overlapping with each end portion of the semiconductor layer 30a.

A conductive film is formed using a conductive portion material with a light shielding property such as Al (aluminum) or alloy thereof to embed two contact holes CNT1 and CNT2 and to cover the third insulating film 11c, and is subjected to patterning, thereby forming a source electrode 31 and the data line 6a connected to the first source and drain area through the contact hole CNT1. Simultaneously, a drain electrode 32 (a first relay electrode 6b) connected to the second source and drain area is formed through the contact hole CNT2.

Then, the data line 6a, the first relay electrode 6b, and a first interlayer insulating film 12 to cover the third insulating film 11c are formed. The first interlayer insulating film 12 is formed of, for example, an oxide or nitride of silicon, and is subjected to a planarization process of planarizing unevenness on the surface caused by covering the area where the TFT 30 is provided. A method of the planarization process may be, for example, a chemical mechanical polishing (CMP) process, a spin coating process, or the like.

A contact hole CNT3 passing through the first interlayer insulating film 12 is formed at a position overlapping with the first relay electrode 6b. A conductive film formed of metal with a light shielding property such as Al (aluminum) or alloy thereof is formed to coat the contact hole CNT3 and to cover the first interlayer insulating film 12, is subjected to patterning, and thus a connection line 7a and a second relay electrode 7b electrically connected to the first relay electrode 6b through the contact hole CNT3 are formed.

The connection line 7a is formed to overlap with the semiconductor layer 30a of the TFT 30 or the data line 6a in the plan view, to which a fixed potential is applied, and serves as a shield layer.

A second interlayer insulating film 13a is formed to cover the connection line 7a and the second relay electrode 7b. The second interlayer insulating film 13a may be also formed of, for example, oxide or nitride of silicon, or oxynitride, and is subjected to a planarization process such as the CMP process.

A contact hole CNT4 is formed at a position of the second interlayer insulating film 13a overlapping with the second relay electrode 7b. A conductive film formed of, for example, a metal with a light shielding property such as Al (aluminum) or alloy thereof is formed to coat the contact hole CNT4 and to cover the second interlayer insulating film 13a, and it is subjected to patterning, thereby forming a first capacitance electrode 16a and a third relay electrode 16d.

In the first capacitance electrode 16a, an insulating film 13b is formed by patterning to cover an outer edge at a position opposed to the second capacitance electrode 16c through a dielectric layer 16b to be formed later. In addition, in the third relay electrode 16d, the insulating film 13b is formed by patterning to cover the outer edge except for the part overlapping with the contact hole CNT5.

The dielectric layer 16b is formed to cover the insulating film 13b and the first capacitance electrode 16a. The dielectric layer 16b may be a monolayer film such as a silicon nitride film, a hafnium oxide ($HfO_2$) film, an alumina ($Al_2O_3$) film, or a tantalum oxide ($Ta_2O_5$) film, or a multilayer film formed by laminating at least two kinds of such monolayer films. The dielectric layer 16b at the part overlapping with the third relay electrode 16d in the plan view is excluded by etching or the like. For example, a conductive film such as TiN (titanium nitride) film is formed to cover the dielectric layer 16b, and it is subjected to patterning, thereby forming a second capacitance electrode 16c opposed to the first capacitance electrode 16a and connected to the third relay electrode 16d. The retentive capacitor 16 is configured by the dielectric layer 16b, the first capacitance electrode 16a and the second capacitance electrode 16c opposed with the dielectric layer 16b interposed therebetween.

Then, a third interlayer insulating film 14 is formed to cover the second capacitance electrode 16c and the dielectric layer 16b. The third interlayer insulating film 14 is also formed of, for example, oxide or nitride of silicon, and is subjected to a planarization process such as the CMP process. A contact hole CNT5 passing through the third interlayer insulating film 14 is formed to reach a part where the second capacitance electrode 16c comes in contact with the third relay electrode 16d.

A transparent conductive film (an electrode film) such as an ITO film is formed to coat the contact hole CNT5 and to cover the third interlayer insulating film 14. The transparent conductive film (the electrode film) is subjected to patterning, and the pixel electrode 15 electrically connected to the second capacitance electrode 16c and the third relay electrode 16d is formed through the contact hole CNT5.

The second capacitance electrode 16c is electrically connected to the drain electrode 32 of the TFT 30 through the third relay electrode 16d, the contact hole CNT4, the second relay electrode 7b, the contact hole CNT3, and the first relay electrode 6b, and is electrically connected to the pixel electrode 15 through the contact hole CNT5.

The first capacitance electrode 16a is formed over the plurality of pixels P, and serves as the capacitance line 3b in the equivalent circuit (see FIG. 3). Accordingly, the potential applied to the pixel electrode 15 through the drain electrode 32 of the TFT 30 is kept between the first capacitance electrode 16a and the second capacitance electrode 16c.

As described above, the plurality of connection line layers are formed on the base material 10s of the element substrate 10, and the connection line layers are represented by reference numerals and signs of the insulating film for insulating between the connection line layers or the interlayer insulating film. That is, the first insulating film 11a, the second insulating film 11b and the third insulating film 11c are called an enclosed connection line layer 11. A representative connection line of the connection line layer 11 is the gate electrode 30g. A representative connection line of the connection line layer 12 is the data line 6a. The second interlayer insulating film 13a, the insulating film 13b and the dielectric layer 16b are called an enclosed connection line layer 13, and a representative connection line is the connection line 7a. Similarly, a representative connection line of the connection line layer 14 is the first capacitance electrode 16a (the capacitance line 3b).

The alignment film 18 is formed to cover the pixel electrode 15, and the alignment film 24 is formed to cover the common electrode 23 of the opposed substrate 20 opposed to the element substrate 10 with the liquid crystal layer 50 interposed therebetween. As described above, the alignment films 18 and 24 are the inorganic alignment films, and are formed of a collected body of columns 18a and 24a grown by depositing inorganic materials such as silicon oxide in a predetermined direction, for example, oblique deposition, in a pillar shape. The liquid crystal molecules LC having negative dielectric anisotropy with respect to such alignment films 18 and 24 are substantially vertically aligned with a pretilt angle θp of 3° to 5° in an oblique direction of the columns 18a and 24a with respect to the normal line direction of the alignment film face. Alternating current potential is applied between the pixel electrode 15 and the common electrode 23 to drive the liquid crystal layer 50, and thus the liquid crystal molecules LC are moved (vibrated) to be oblique in the direction of the electric field generated between the pixel electrode 15 and the common electrode 23.

Figure 5:
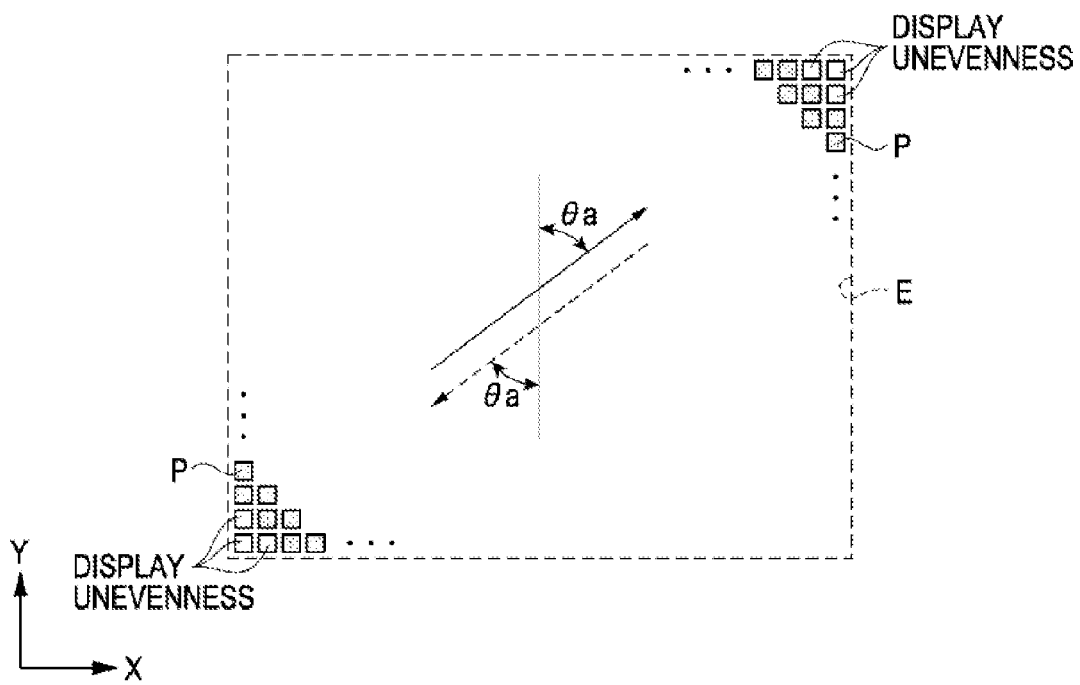
FIG. 5 is a schematic plan view illustrating a relationship between an oblique deposition direction of an inorganic material and a display defect caused by ionic impurities.

FIG. 5 is a schematic plan view illustrating a relationship between the oblique deposition direction of the inorganic material and the display defects caused by the ionic impurities. As shown in FIG. 5, the oblique deposition direction of the inorganic material in the forming of the columns 18a and 24a is a direction intersecting the Y direction at a predetermined orientation angle θa from the upper right to the lower left as indicated by the broken line arrow, for example, on the element substrate 10 side. On the opposed substrate 20 side opposed to the element substrate 10, the direction is a direction intersecting the Y direction at the predetermined orientation angle θa from the lower left to the upper right as indicated by the solid line arrow. The predetermined angle θa is, for example, 45°. In addition, the oblique deposition direction shown in FIG. 5 is a direction when viewing the liquid crystal device 100 on the opposed substrate 20 side.

By driving the liquid crystal layer 50, movement (the vibration) of the liquid crystal molecules LC occurs and flow of the liquid crystal molecules LC occurs in the oblique deposition direction indicated by the broken line or solid line shown in FIG. 5 in the vicinity of an interface between the liquid crystal layer 50 and the alignment films 18 and 24. If positive or negative ionic impurities are included in the liquid crystal layer 50, the ionic impurities are guided to the corner portions of the pixel area E according to the flow of the liquid crystal molecules LC and may be eccentrically located. When insulating resistance of the liquid crystal layer 50 is decreased with respect to the pixels P positioned at the corner portions by the eccentric location of the ionic impurities, the driving potential is decreased with respect to the pixel P, and the display unevenness shown in FIG. 5 or a burn-in phenomenon caused by electric connection significantly occurs.

In the liquid crystal device 100 of the embodiment, direct current potential is applied to the peripheral electrode 141 as the second connection line layer of the element substrate 10 shown in FIG. 2 to improve the eccentric location of the positive or negative ionic impurities which is a factor for causing display unevenness or burn-in phenomenon. As described above, the element substrate 10 has a plurality of connection line layers, and various connection lines to which a predetermined potential is applied are present in the peripheral area between the seal member 40 and the pixel area E. To sufficiently exhibit the function of the peripheral electrode 141, it is necessary to make it difficult to receive the influence of the potential of the other connection line, and it is necessary to optimize the relative disposition between the peripheral electrode 141 and the other connection line. Hereinafter, an example based on the connection line structure of the element substrate 10 of the embodiment will be described.

Figure 6:
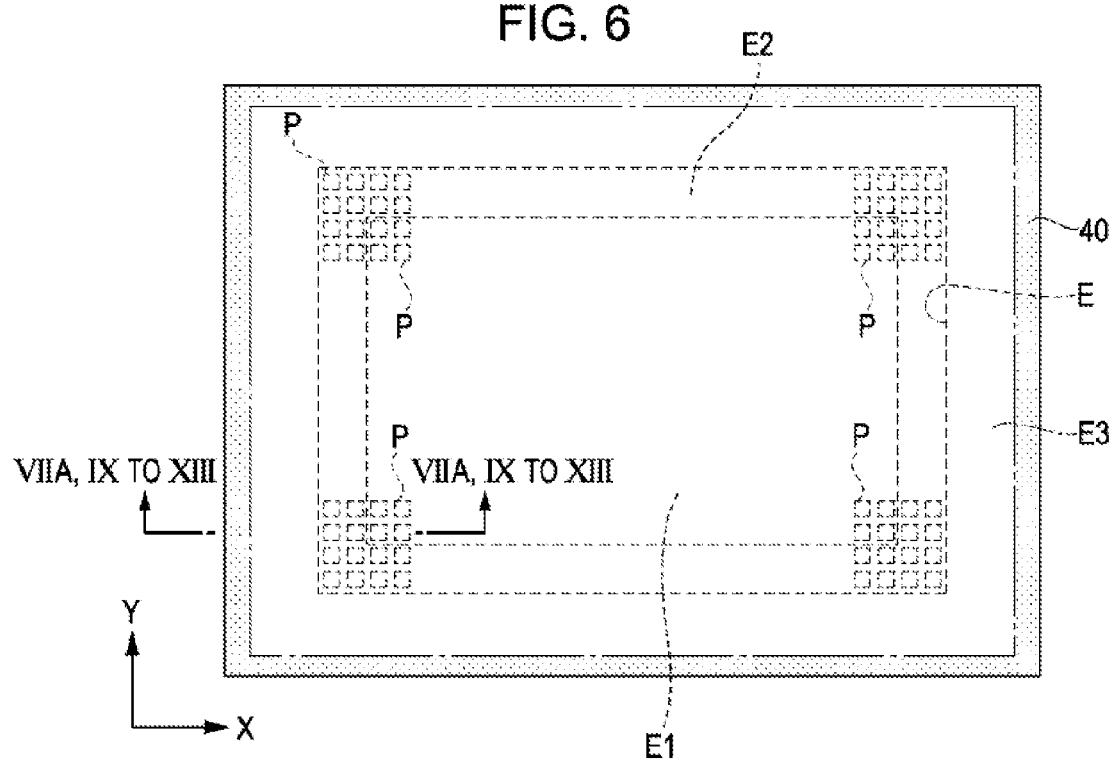
FIG. 6 is a schematic plan view illustrating a planar position of a connection line structure described in an example.

FIG. 6 is a schematic plan view illustrating a planar position of the connection line structure shown in the example. As shown in FIG. 6, the pixel area E includes a display area E1 where the pixels P contributing to display are arranged in the X direction and the Y direction, and a dummy pixel area E2 where a plurality of dummy pixels P surrounding the display area E1 are disposed. An area between the seal member 40 surrounding to the pixel area E and the pixel area E is called a peripheral area E3. Hereinafter, in the examples, as shown in FIG. 6, a schematic cross-sectional view of the liquid crystal device 100 cut by the line VI-VI from the left side of the seal member 40 surrounding the peripheral area E3 to the pixels P positioned at the lower left corner portion of the display area E1 is shown and described. In the connection line structure of the element substrate 10 at the portion of the peripheral area E3 along the left side of the seal member 40, the connection line structure of the element substrate 10 at the portion of the peripheral area E3 along the right side of the seal member 40 is a structure symmetric basically with respect to the X direction. In addition, in FIG. 6, at the portion of the peripheral area E3 along the upper side of the pixel area E and the portion of the peripheral area E3 along the lower side of the pixel area E, the connection line for supplying the reference potential (VSS) lower than the common potential (LCCOM) of the first connection line layer in the invention for supplying the positive potential to the scanning line driving circuit 102 is not disposed. The connection line with a potential equal to the common potential (LCCOM) or higher than the common potential (LCCOM) is disposed. In the embodiment, the positive potential connection line is a connection line for supplying the driving potential (VDDY) or the reference potential (VSSY) as power to the last stage of a buffer circuit of the scanning line driving circuit 102.

In the power (the positive potential) supplied to the scanning line driving circuit 102 in the liquid crystal device 100 of the embodiment, for example, the driving potential (VDDY) is 15.5 v, and the reference potential (VSSY) is 0 v (GND). The common potential (LCCOM) applied to the capacitance line 3b or the common electrode 23 of the opposed substrate 20 is, for example, 6 v. A rectangular alternating potential in the range of ±5 v in which the common potential (LCCOM) is a reference is applied to the pixel electrode 15 in the pixel P for display, corresponding to a frame based on a driving frequency, according to a gradation degree of the image signal.

In the connection line structure of the element substrate 10 in the following examples, "the same layer" means a connection line formed with the same film thickness using the same connection line material in the same connection line layer. In the case of the same connection line layer, it is possible to simultaneously form connection lines with different connection destinations by, for example, photolithography. In addition, the connection lines are not limited to simultaneous forming, and may be formed at the different times.

EXAMPLE 1

Figure 7A:
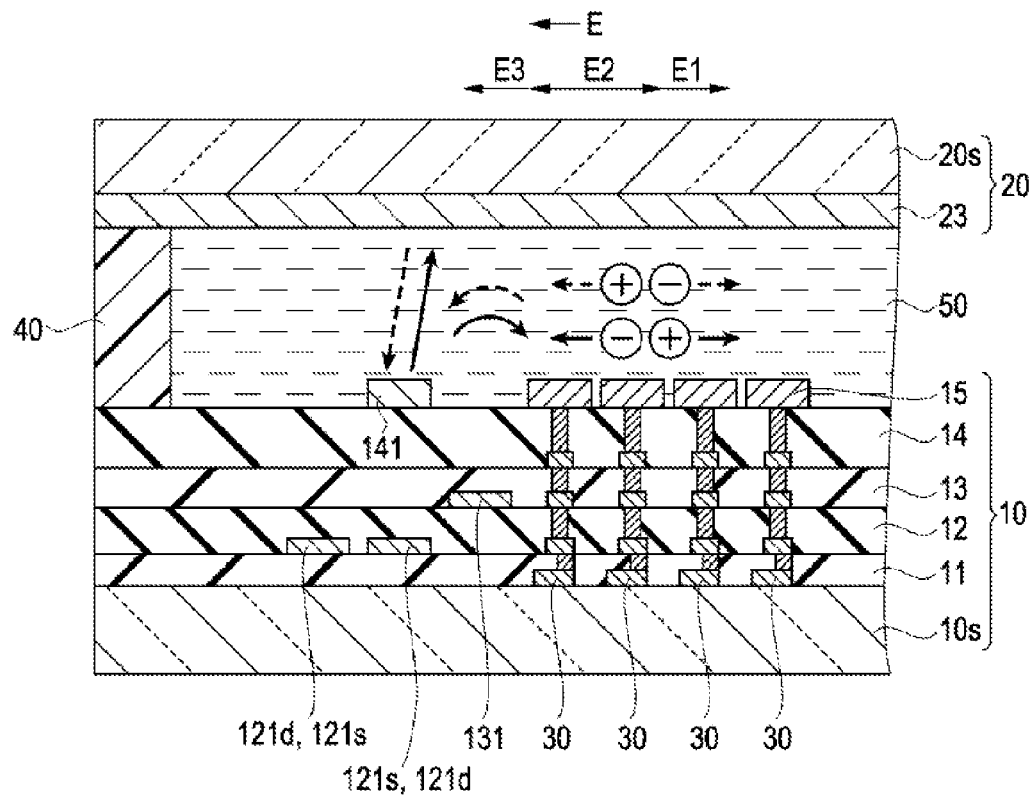
FIG. 7A is a schematic cross-sectional view illustrating a connection line structure in an element substrate of Example 1.
Figure 7B:
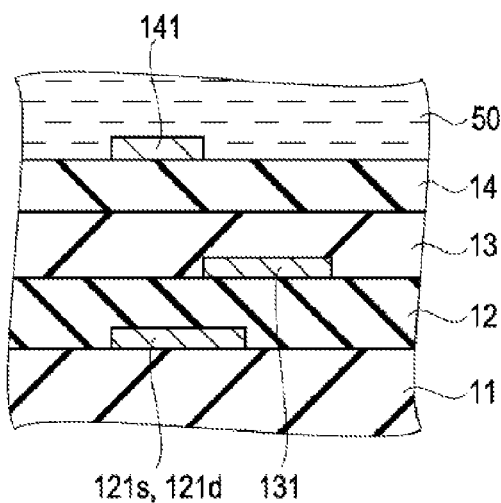
FIG. 7B is a schematic cross-sectional view illustrating a modification example in disposition of a peripheral electrode and a connection line of Example 1.

FIG. 7A is a schematic cross-sectional view illustrating a connection line structure in an element substrate of Example 1, and FIG. 7B is a schematic cross-sectional view illustrating a modification example in disposition of a peripheral electrode and a connection line of Example 1.

As shown in FIG. 7A, in Example 1, in the connection line layer 12 of the peripheral area E3, a scanning line driving circuit connection line 121s (hereinafter, referred to as a positive potential connection line 121s) to which the reference potential (VSSY) is supplied (applied), and a scanning line driving circuit connection line 121d to (hereinafter, referred to as a positive potential connection line 121d) to which the driving potential (VDDY) is supplied (applied) are disposed. A connection line 131 for supplying (applying) the common potential (LCCOM) to the connection line layer 13 between the positive potential connection line 121s and the dummy pixel area E2 is disposed. In the same layer as the pixel electrode 15, the peripheral electrode 141 is disposed at the position overlapping with the positive potential connection line 121s of the connection line layer 12. In Example 1, an example of the first connection line layer in the invention is the positive potential connection lines 121s and 121d, an example of the second connection line layer in the invention is the peripheral electrode 141, and an example of the third connection line layer in the invention is the connection line 131.

Figure 8:
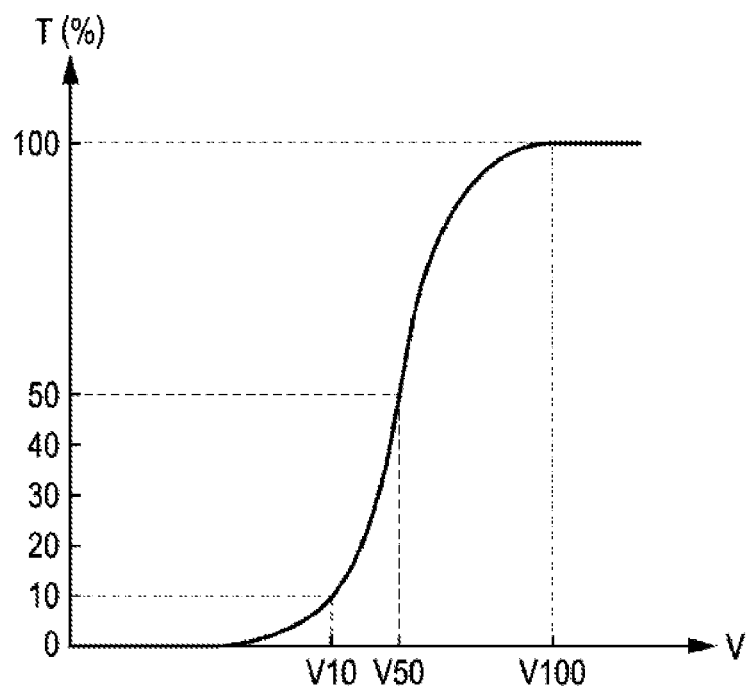
FIG. 8 is a V-T curve illustrating a relationship between a driving voltage and the transmittance of a pixel in the liquid crystal device.

FIG. 8 is a V-T curve illustrating a relationship between the driving voltage and the transmittance of the pixel in the liquid crystal device. For example, in the case of normally black, the alternating current potential based on the image signal is applied to the pixel electrode 15 of the display area E1 as described above, and the transmittance of the pixel P is changed in the range of 0% to 100% represented by the V-T curve shown in FIG. 8. When the liquid crystal device 100 is driven, a potential with transmittance to an extent that light leakage does not occur, for example, equal to or lower than potential V50 with transmittance of 50% or lower, preferably, equal to or lower than V10 with transmittance of 10% or lower is applied to the pixel electrode 15 of the dummy pixel area E2, irrespective of the ON-OFF state of the liquid crystal layer 50. Specifically, the V50 is ±2.5 v in which the common potential (LCCOM: 6 v) is reference, and the V10 is about ±1 v in which the common electrode (LCCOM: 6 v) is reference.

First, a case where the peripheral electrode 141 of Example 1 is not provided will be described. In the peripheral area E3, the positive potential connection line 121s is disposed between the positive potential connection line 121d and the connection line 131, in which the reference potential (VSSY) is lower than the connection line 131 to which the common potential (LCCOM) is applied and the reference potential is supplied to the positive potential connection line 121s, and thus the first electric field from the pixel electrode 15 of the dummy pixel area E2 with a potential higher than the positive potential connection line 121s to the positive potential connection line 121s is generated. When the positive ionic impurities are included in the liquid crystal layer 50, the positive ionic impurities may be attracted to the positive potential connection line 121s with the potential (0 v) lower than the potential of the connection line 131 (the common potential; 6 v). Accordingly, the display unevenness caused by the eccentric location of the ionic impurities shown in FIG. 5 easily occurs. In addition, the negative ionic impurities are not led to the positive potential connection line 121s but are reversed to the display area E1 side by the influence of the first electric field between the positive potential connection line 121s and the pixel electrode 15.

Meanwhile, in Example 1, for example, a +7 v direct current potential as the second potential higher than the common electrode (LCCOM: 6 v) is applied to the peripheral electrode 141 provided in the same layer as the pixel electrode 15. As indicated by the solid line arrow shown in FIG. 7A, the second electric field from the peripheral electrode 141 to the pixel electrode 15 and from the peripheral electrode 141 to the common electrode 23 is generated. The second electric field has a direction reverse to the first electric field described above, and may reverse the positive ionic impurities which can be attracted by the first electric field, to the display area E1 side to disperse the positive ionic impurities in the liquid crystal layer 50. That is, it is possible to reduce the display unevenness caused by eccentric location of the positive ionic impurities at the corner portions of the pixel area E. Meanwhile, the negative ionic impurities are attracted and adsorbed to the peripheral electrode 141 stronger than the positive potential connection line 121s. Even when the negative ionic impurities are adsorbed to the peripheral electrode 141 and have an influence on the alignment of the liquid crystal molecules, the peripheral area E3 is optically shielded by the closeout portion 21 as shown in FIG. 1, and thus the display unevenness caused by the eccentric location of the negative ionic impurities is invisible.

The disposition of the positive potential connection lines 121s and 121d as the first connection line layer in Example 1 and the potential applied to the peripheral electrode 141 are not limited thereto. For example, as shown in parentheses in FIG. 7A, the positions of the positive potential connection lines 121s and 121d may be changed, and the positive potential connection line 121d to which the driving potential (VDDY) is applied may be disposed between the positive potential connection line 121s and the connection line 131. In this case, in the peripheral area E3, the positive potential connection line 121d is disposed between the positive potential connection line 121s and the connection line 131, in which the positive potential connection line 121d to which the driving potential (VDDY) is supplied is higher than the connection line 131 to which the common potential (LCCOM) is applied, and thus the first electric field from the positive potential connection line 121d to the pixel electrode 15 of the dummy pixel area E2 with a potential lower than the positive potential connection line 121d is generated. When the negative ionic impurities are included in the liquid crystal layer 50, the negative ionic impurities may be attracted to the positive potential connection line 121d with the potential (15.5 v) higher than the connection line 131 (the common potential: 6 v). Accordingly, the peripheral electrode 141 is provided to overlap with the positive potential connection line 121d in the plan view in the same layer as the pixel electrode 15, and for example, a +5 v direction current potential as the second potential lower than the common potential (LCCOM: 6 v) is applied to the peripheral electrode 141. Then, as indicated by the broken arrow of FIG. 7A, the second electric field from the pixel electrode 15 to the peripheral electrode 141 and from the common electrode 23 to the peripheral electrode 141 is generated. Accordingly, the negative ionic impurities attracted in the first electric field between the positive potential connection line 121d and the pixel electrode 15 may be reversed to the display area E1 side to disperse the negative ionic impurities in the liquid crystal layer 50. That is, it is possible to reduce the display unevenness caused by eccentric location of the negative ionic impurities at the corner portions of the pixel area E. Meanwhile, the positive ionic impurities are attracted and adsorbed to the peripheral electrode 141 stronger than the positive potential connection line 121d. Even when the positive ionic impurities are adsorbed to the peripheral electrode 141 and have an influence on the alignment of the liquid crystal molecules, the peripheral area E3 is optically shielded by the closeout portion 21 as shown in FIG. 1, and thus the display unevenness caused by the eccentric location of the positive ionic impurities is invisible.

It is thought that the ionic impurities are included in materials constituting the liquid crystal device 100, or infiltrate in the process of manufacturing the liquid crystal device 100 from other members or chemicals. Accordingly, the ionic impurities included in the liquid crystal layer 50 may include those representing both positive and negative polarities, but there are few cases where the amounts of positive and negative ionic impurities are the same. By analyzing a product representing the display unevenness or burn-in phenomenon shown in FIG. 5, it is possible to investigate the polarity of the ionic impurities included in the liquid crystal layer 50. According to the polarity of dominant ionic impurities, when the peripheral electrode 141 is disposed and the corresponding direct current potential is applied as described in Example 1, it is possible to reduce the display unevenness or burn-in phenomenon caused by the eccentric location of the dominant ionic impurities.

The magnitude of the second potential applied to the peripheral electrode 141 is a potential equal to or lower than V50 with respect to the common potential (LCCOM: 6 v), preferably a potential equal to or lower than V10, such that the alignment state of the liquid crystal molecules in the dummy pixel area E2 is disturbed and a defect such as light leakage does not occur.

In addition, as shown in FIG. 7B, when the positive potential connection line 121s (the positive potential connection line 121d) provided in the connection line layer 12 and the connection line 131 provided in the connection line layer 13 are overlapped in the plan view, it is preferable to dispose the peripheral electrode 141 to overlap with the part of the positive potential connection line 121s (the positive potential connection line 121d) which does not overlap with the connection line 131. In other words, when there is an area which is not covered with the peripheral electrode 141 in the positive potential connection line 121s (the positive potential connection line 121d), it is preferable to dispose the connection line 131 to overlap with at least a part of the area of the positive potential connection line 121s (the positive potential connection line 121d) which does not overlap with the peripheral electrode 141 in the plan view. Accordingly, the first electric field generated between the potential connection line 121s (the positive potential connection line 121d) and the pixel electrode 15 is blocked by the connection line 131 as the third connection line layer, and it is possible to reduce that the positive or negative ionic impurities are attracted to the positive potential connection line 121 (the positive potential connection line 121d).

EXAMPLE 2

Figure 9:
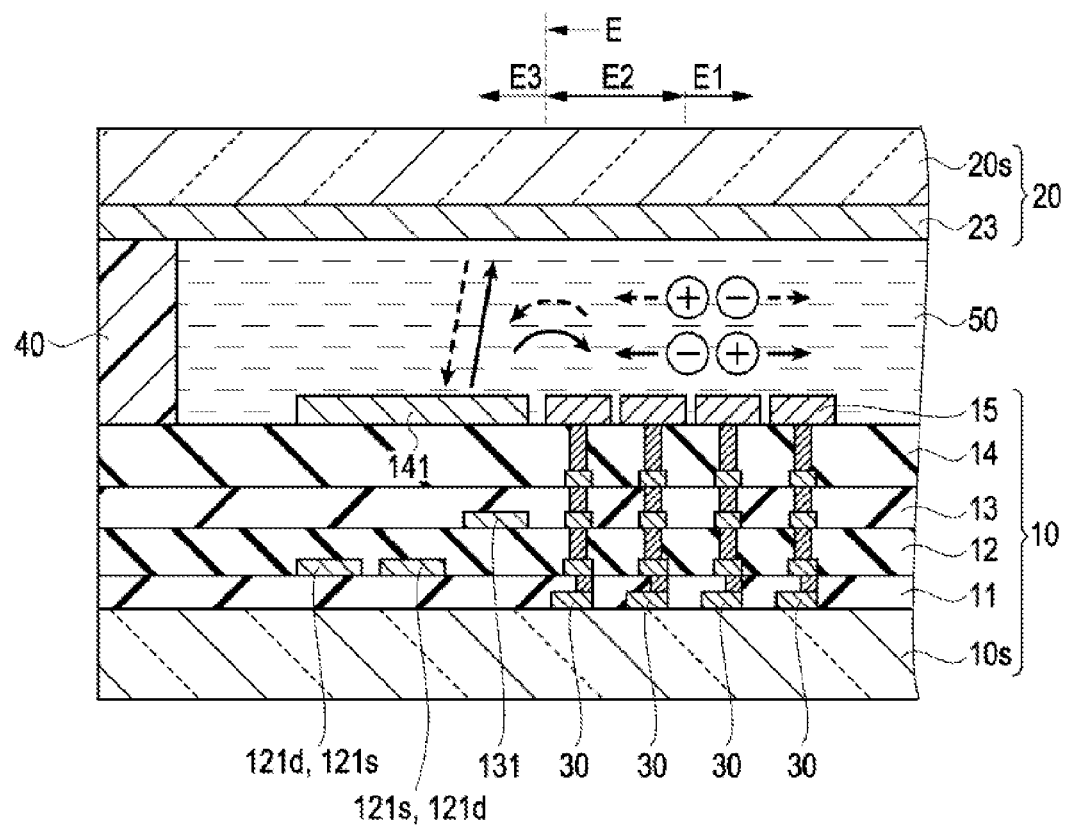
FIG. 9 is a schematic cross-sectional view illustrating a connection line structure of an element substrate of Example 2.

FIG. 9 is a schematic cross-sectional view illustrating a connection line structure in an element substrate of Example 2 shown in FIG. 9. In Example 2, a range where the peripheral electrode 141 is provided is different from that of Example 1. Specifically, as shown in FIG. 9, the peripheral electrode 141 of Example 2 is formed in the same layer as the pixel electrode 15 such that the positive potential connection lines 121s and 121d provided in the connection line layer 12 overlaps with the connection line 131 provided in the connection line layer 13 in the plan view.

According to Example 2, the first electric field generated between the positive potential connection lines 121s and 121d and the pixel electrode 15 is blocked, and it is possible to raise the intensity of the second electric field generated between the peripheral electrode 141 and the pixel electrode 15. By the direct current potential applied to the peripheral electrode 141, one of the positive or negative ionic impurities is reversed and dispersed in the liquid crystal layer 50, and the others are adsorbed to the peripheral electrode 141 with an area broader than that of Example 1. That is, it is possible to further reduce the display unevenness or burn-in phenomenon caused by the eccentric location of the positive or negative ionic impurities at the corner portions of the pixel area E.

The disposition of the positive potential connection lines 121s and 121d in Example 2 is not limited thereto, and the position may be changed to dispose the connection lines as described in Example 1. The direct current potential applied to the peripheral electrode 141 is the same as Example 1, and the direct current potential according to the polarity of the ionic impurities dominantly included in the liquid crystal layer 50 is applied.

The peripheral electrode 141 may overlap with the positive potential connection lines 121s and 121d as the first connection line layer in the plan view, and may not overlap with all the connection lines 131 to which the common potential (LCCOM) is applied.

EXAMPLE 3

Figure 10:
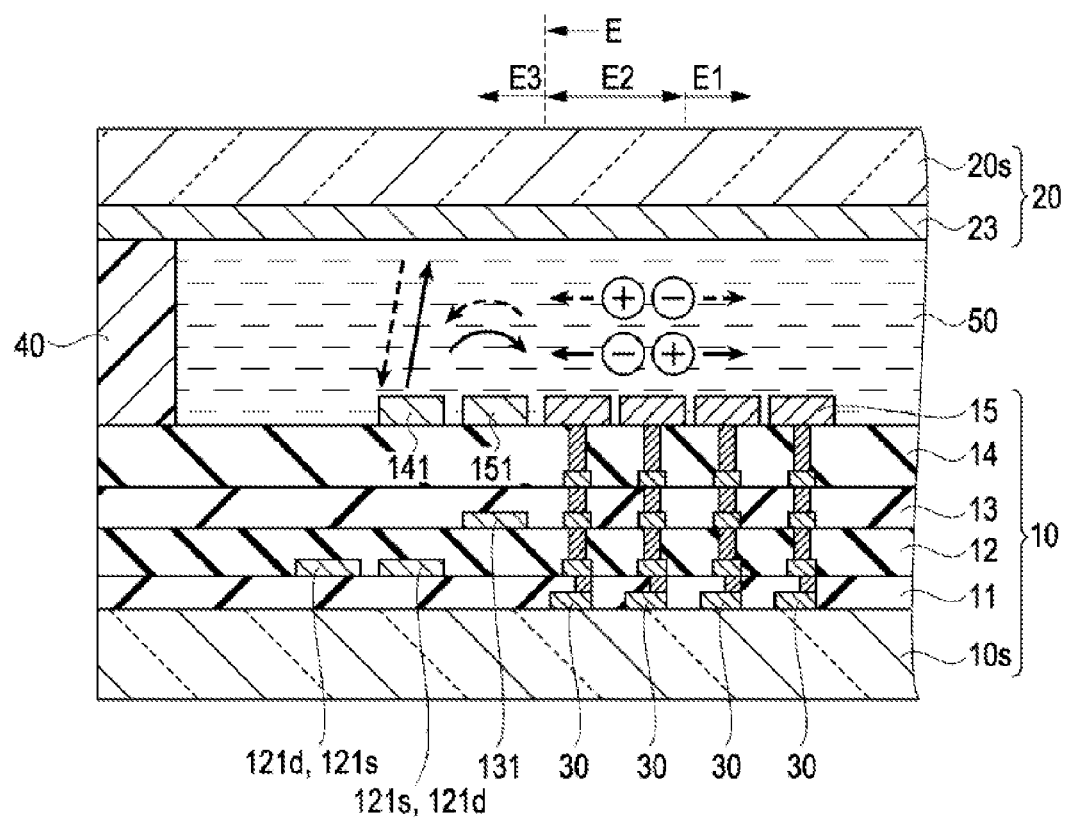
FIG. 10 is a schematic cross-sectional view illustrating a connection line structure of an element substrate of Example 3.

FIG. 10 is a schematic cross-sectional view illustrating a connection line structure in an element substrate of Example 3. As shown in FIG. 10, in Example 3, in the same layer as the pixel electrode 15, a second peripheral electrode 151 to which the common electrode (LCCOM: 6 v) is applied is provided between the peripheral electrode 141 and the pixel electrode 15 of the dummy pixel area E2 differently from Example 1.

According to Example 3, the second peripheral electrode 151 to which the direct current common potential (LCCOM: 6 v) is applied is disposed between the peripheral electrode 141 to which a direct current potential higher than or lower than the common potential (LCCOM: 6 v) is applied, and the pixel electrode 15 of the dummy pixel area E2 to which alternating current potential is applied in which the common potential (LCCOM: 6 v) is reference, and thus it is possible to raise the intensity of the second electric field generated (indicated by the solid line or the broken line) between the peripheral electrode 141 and the pixel electrode 15.

In addition, when the positive or negative ionic impurities are adsorbed to the peripheral electrode 141, the electrode to which the direct current potential is applied is parallel by disposing the second peripheral electrode 151 between the pixel electrodes 15, and it is difficult to diffuse the ionic impurities adsorbed to the peripheral electrode 141 to the pixel electrode 15 side.

The planar disposition of the second peripheral electrode 151 may be disposition between the peripheral electrode 141 and the pixel area E to surround the pixel area E, may be linear disposition to overlap with the connection line 131 in the plan view along the left side and the right side of the pixel area E in FIG. 6 considering an occurrence situation of the display unevenness shown in FIG. 5. A method of applying the common potential (LCCOM) to the second peripheral electrode 151 may be a method of providing a contact hole at a position overlapping with the connection line 132 extending in the X direction shown in FIG. 2 and electrically connecting the second peripheral electrode 151 and the connection line 132.

EXAMPLE 4

Figure 11:
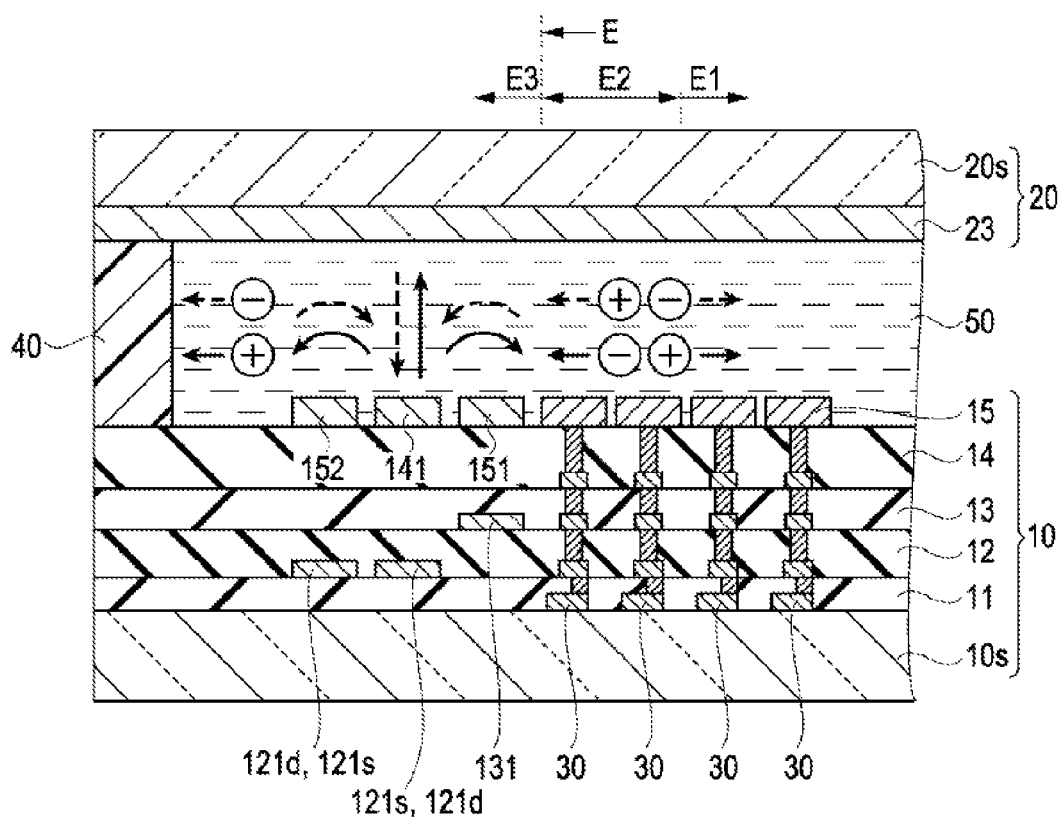
FIG. 11 is a schematic cross-sectional view illustrating a connection line structure of an element substrate of Example 4.

FIG. 11 is a schematic cross-sectional view illustrating a connection line structure of an element substrate of Example 4. As shown in FIG. 11, in Example 4, a third peripheral electrode 152 to which the common potential (LCCOM: 6 v) is applied is further provided between the peripheral electrode 141 and the seal member 40 differently from Example 3.

There is a worry that the seal member 40 may include ionic impurities such as a small amount of metal ions or uncured materials in the process of manufacturing the seal member 40 or the liquid crystal device 100.

According to Example 4, the third peripheral electrode 152 to which the common potential is applied is disposed between the seal member 40 and the peripheral electrode 141 in the peripheral area E3. In addition, the third peripheral electrode 152 is disposed to overlap with the positive potential connection line 121d (the positive potential connection line 121s) as the first connection line layer in the plan view.

Accordingly, the third electric field is generated between the peripheral electrode 141 to which the direct current potential higher or lower than the common potential (LCCOM: 6 v), and the third peripheral electrode 152 to which the common potential (LCCOM: 6 v) is applied. By the direction of the third electric field indicated by the solid line or the broken line, it is possible to reduce that the positive or negative ionic impurities to be diffused from the seal member 40 into the liquid crystal layer 50 are reversed to the seal member 40 side to be diffused to the display area E1 side.

That is, in Example 4, it is possible to improve the display defect caused by the ionic impurities included in the seal member 40 as well as the ionic impurities included in the liquid crystal layer 50.

EXAMPLE 5

Figure 12:
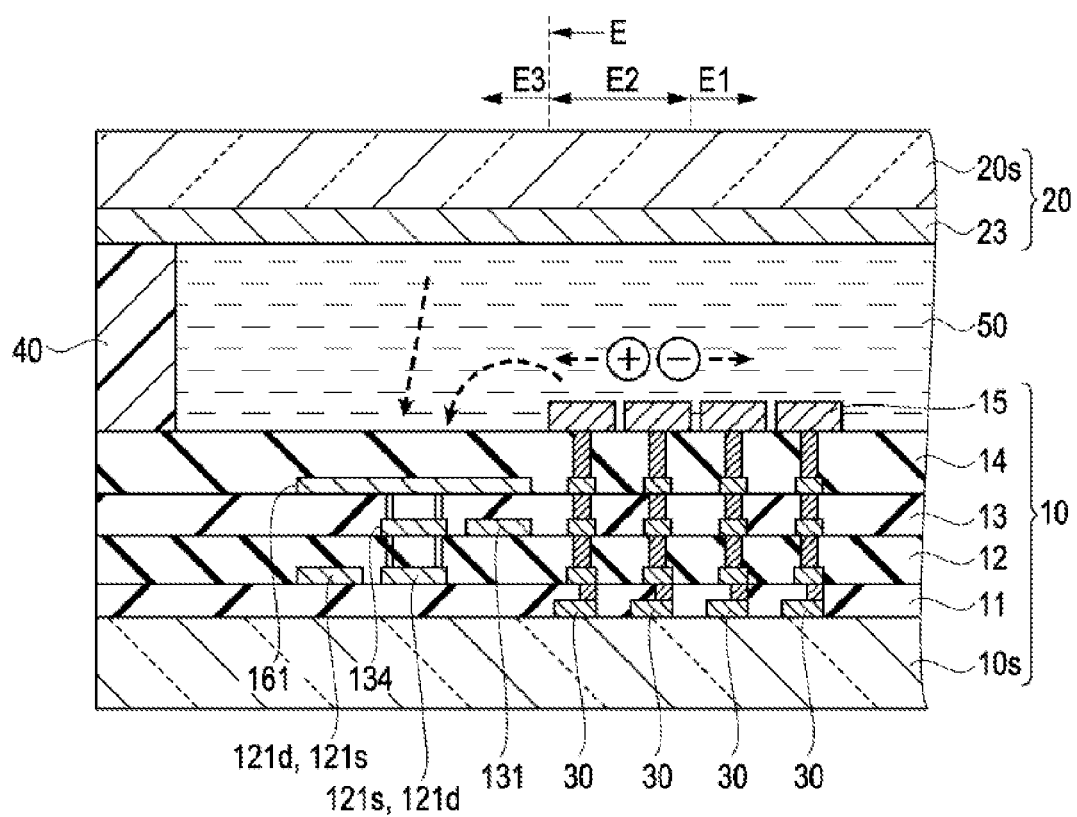
FIG. 12 is a schematic cross-sectional view illustrating a connection line structure of an element substrate of Example 5.

FIG. 12 is a schematic cross-sectional view illustrating a connection line structure of an element substrate of Example 5. As shown in FIG. 12, in Example 5, on the base material 10s of the element substrate 10, a peripheral electrode 161 as the second connection line layer is formed in the connection line layer 14 between the positive potential connection lines 121d and 121s as the first connection line layer and the pixel electrode 15. The peripheral electrode 161 is electrically connected to the positive potential connection line 121s to which the reference potential (VSSY: 0 v) is applied, through a relay electrode 134 formed in connection line layer 13 of the lower layer. In addition, the positive potential connection lines 121d and 121s as the first connection line layer and the connection line 131 as the third connection line layer are disposed to overlap in the plan view. In addition, the peripheral electrode 161 is formed in the connection line layer 14 to surround the pixel area E in the plan view similarly to the peripheral electrode 141 of Example 1. In addition, it may be disposed to overlap with the positive potential connection lines 121d and 121s as at least the first connection line layer in the plan view, and may not overlap with the whole of the connection line 131.

According to Example 5, as indicated by the broken line arrow shown in FIG. 12, the electric field from the pixel electrode 15 to the peripheral electrode 161 is generated between the peripheral electrode 161 and the pixel electrode 15 of the dummy pixel area E2. In addition, the electric field from the common electrode 23 to the peripheral electrode 161 is generated between the peripheral electrode 161 and the common electrode 23. When the electric field is the fourth electric field, the positive ionic impurities included in the liquid crystal layer 50 may be attracted to the peripheral electrode 161 by the fourth electric field, and the negative ionic impurities are reversed. The intensity of the fourth electric field is determined by the material and film thickness of the third interlayer insulating film 14 between the peripheral electrode 161 and the liquid crystal layer 50. For example, when the film thickness is about 600 nm in which the third interlayer insulating film 14 is a laminated film of NSG and BSG, the direct current potential on the surface coming in contact with the liquid crystal layer 50 of the connection line layer 14 provided with the peripheral electrode 161 may be about ±1 v.

That is, even when the peripheral electrode 141 is not provided in the same layer as the pixel electrode 15 as described in Example 1, it is possible to obtain the same effect as that of the peripheral electrode 141. In addition, in the case of the peripheral electrode 141, the potential lower than the common potential (LCCOM) is applied from the outside through the external connection terminal 104. However, in Example 5, it is possible to apply the potential lower than the common potential (LCCOM) to the peripheral electrode 161 using the potential of the positive potential connection line 121s for supplying the power (the positive potential) to the scanning line driving circuit 102 in the liquid crystal device 100. That is, the potential may not be supplied from the outside, and thus it is possible to effectively use it without increasing the external connection terminal 104.

EXAMPLE 6

Figure 13:
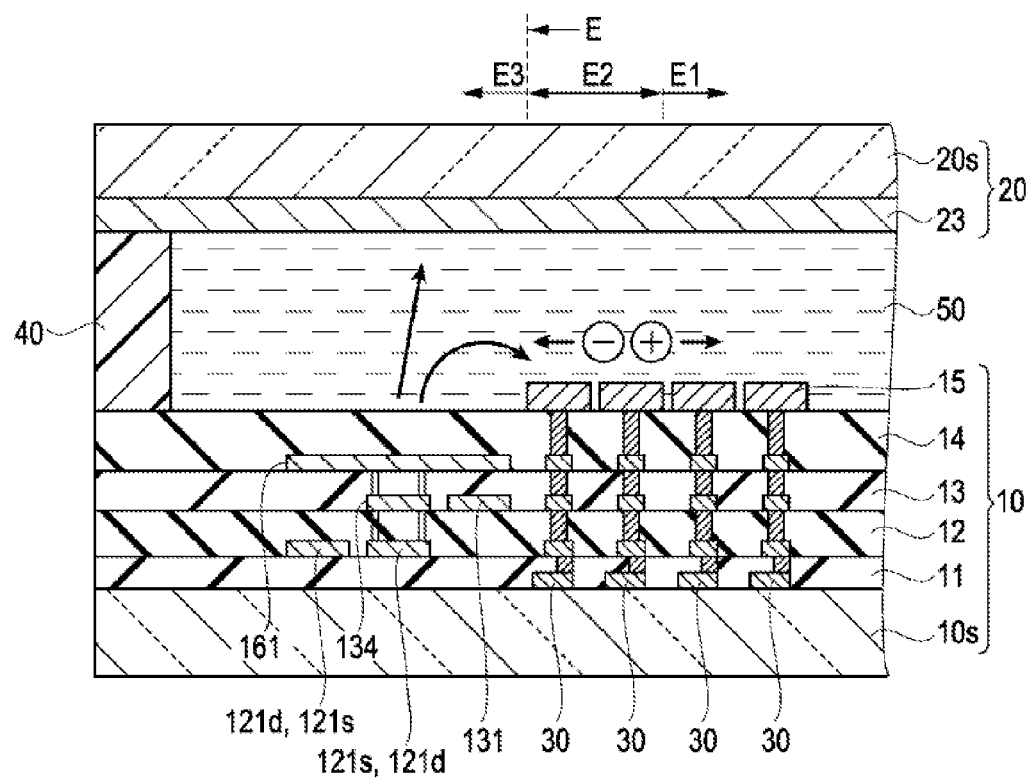
FIG. 13 is a schematic cross-sectional view illustrating a connection line structure of an element substrate of Example 6.

FIG. 13 is a schematic cross-sectional view illustrating a connection line structure of an element substrate of Example 6. As shown in FIG. 13, in Example 6, the first connection line layer electrically connected to the peripheral electrode 161 as the second connection line layer in Example 5 is the positive potential connection line 121d to which the driving potential (VDDY) is supplied.

On the base material 10s of the element substrate 10, a peripheral electrode 161 is formed in the connection line layer 14 between the positive potential connection lines 121s and 121d as the first connection line layer and the pixel electrode 15. The peripheral electrode 161 is electrically connected to the positive potential connection line 121d to which the driving potential (VDDY: 15.5 v) is applied, through a relay electrode 134 formed in connection line layer 13 of the lower layer. In addition, the positive potential connection lines 121s and 121d as the first connection line layer and the connection line 131 as the third connection line layer are disposed to overlap in the plan view. The peripheral electrode 161 is formed in the connection line layer 14 to surround the pixel area E in the plan view similarly to the peripheral electrode 141 of Example 1. In addition, it may be disposed to overlap with the positive potential connection lines 121s and 121d as at least the first connection line layer in the plan view, and may not overlap with the whole of the connection line 131.

According to Example 6, as indicated by the solid line arrow shown in FIG. 13, the electric field from the peripheral electrode 161 to the pixel electrode 15 is generated between the peripheral electrode 161 and the pixel electrode 15 of the dummy pixel area E2. In addition, the electric field from the peripheral electrode 161 to the common electrode 23 is generated between the peripheral electrode 161 and the common electrode 23. When the electric field is the fifth electric field, the negative ionic impurities included in the liquid crystal layer 50 may be attracted to the peripheral electrode 161 by the fifth electric field, and the positive ionic impurities are reversed. The intensity of the fifth electric field is determined by the material and film thickness of the third interlayer insulating film 14 between the peripheral electrode 161 and the liquid crystal layer 50. For example, when the film thickness is about 600 nm in which the third interlayer insulating film 14 is a laminated film of NSG and BSG, the direct current potential on the surface coming in contact with the liquid crystal layer 50 of the connection line layer 14 provided with the peripheral electrode 161 may be about ±14.5 v.

That is, even when the peripheral electrode 141 is not provided in the same layer as the pixel electrode 15 as described in Example 1, it is possible to obtain the same effect as that of the peripheral electrode 141. In addition, in the case of the peripheral electrode 141, the potential higher than the common potential (LCCOM) is applied from the outside through the external connection terminal 104. However, in Example 6, it is possible to apply the potential higher than the common potential (LCCOM) to the peripheral electrode 161 using the potential of the positive potential connection line 121d for supplying the power (the positive potential) to the scanning line driving circuit 102 in the liquid crystal device 100. That is, the potential may not be supplied from the outside, and thus it is possible to effectively use it without increasing the external connection terminal 104.

As described above, in the liquid crystal device 100 of the embodiment, as described in Example 1 to Example 6, in the peripheral area E3 of the pixel area E, the peripheral electrode 141 (the peripheral electrode 161) is disposed considering the disposition of the positive potential connection lines 121s and 121d for supplying the power (the positive potential) to the last stage of the buffer circuit of the scanning line driving circuit 102 or the connection line 131 to which the common potential (LCCOM) is applied. By applying the direct current potential to the peripheral electrode 141 (the peripheral electrode 161), it is possible to reduce the display unevenness or burn-in phenomenon caused by the eccentric location of the ionic impurities included in the liquid crystal layer 50 or the seal member 40 at the corner portions of the pixel area E.

Second Embodiment
Electronic Apparatus

Figure 14:
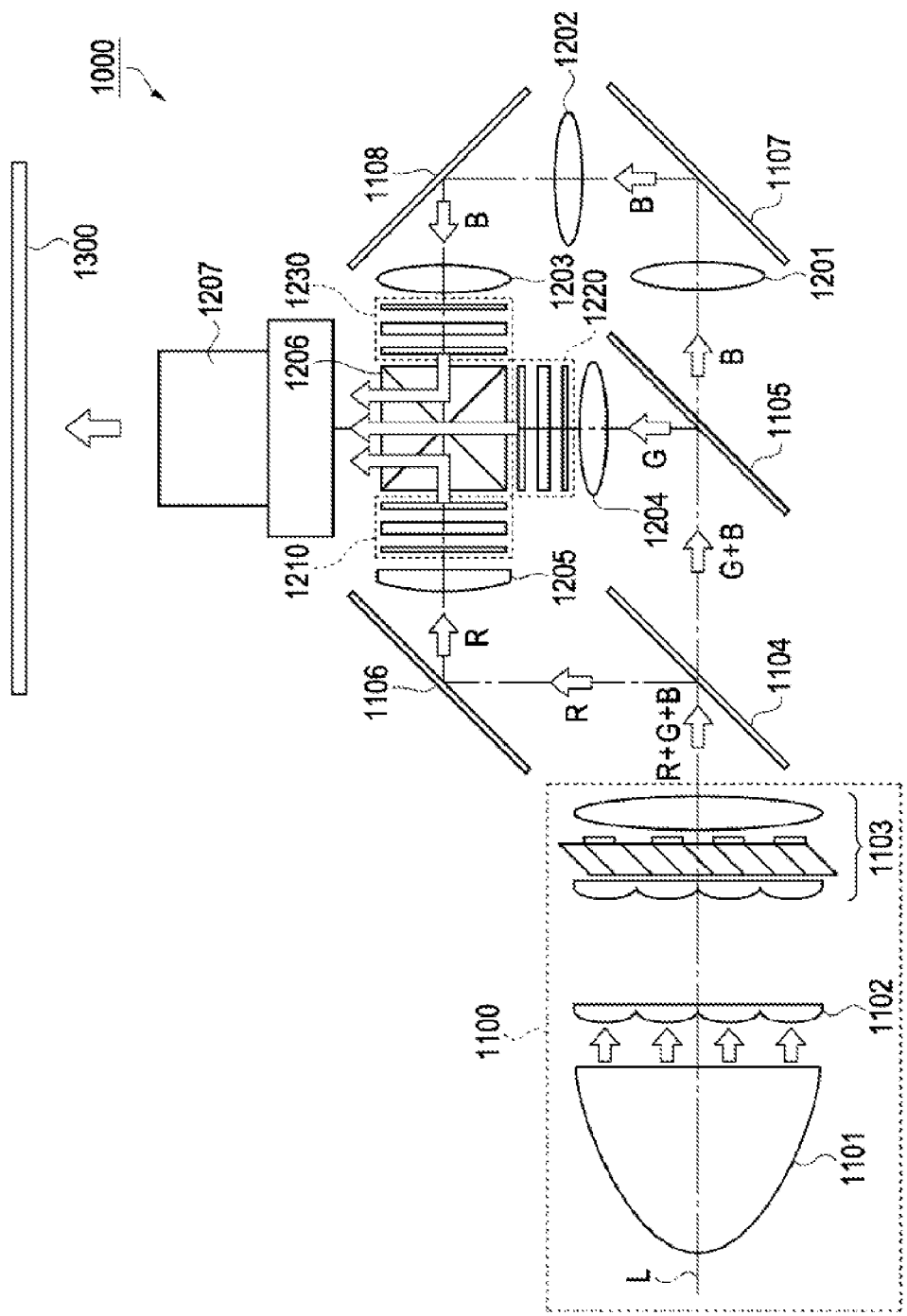
FIG. 14 is a schematic diagram illustrating a configuration of a projection type display apparatus.

Next, a projection type display apparatus as an electronic apparatus of the embodiment will be described with reference to FIG. 14. FIG. 14 is a schematic diagram illustrating a configuration of the projection type display apparatus.

As shown in FIG. 14, the projection type display apparatus 1000 as the electronic apparatus of the embodiment includes a polarization illumination device 1100 that is disposed along a system optical axis L, two dichroic mirrors 1104 and 1105 as optical separation elements, three reflection mirrors 1106, 1107, and 1108, five relay lenses 1201, 1202, 1203, 1204, and 1205, three projection type liquid crystal light valves 1210, 1220, and 1230 as optical modulation means, a cross-dichroic prism 1206 as an optical synthetic element, and a projection lens 1207.

The polarization illumination device 1100 schematically includes a lamp unit 1101 as a light source that is formed of a white light source such as an ultrahigh pressure mercury or halogen lamp, an integrator lens 1102, and a polarization conversion element 1103.

The dichroic mirror 1104 reflects red light (R) of the polarization light flux emitted from the polarization illumination device 1100, and allows green light (G) and blue light (B) to pass. In addition, one dichroic mirror 1105 reflects the green light (G) passing through the dichroic mirror 1104, and allows the blue light (B) to pass.

The red light (R) reflected by the dichroic mirror 1104 is reflected by the reflection mirror 1106, and then is input to the liquid crystal light valve 1210 through the relay lens 1205.

The green light (G) reflected by the dichroic mirror 1105 is input to the liquid crystal light valve 1220 through the relay lens 1204.

The blue light (B) passing through the dichroic mirror 1105 is input to the liquid crystal light valve 1230 through a light guide system formed of three relay lenses 1201, 1202, and 1203 and two reflection mirrors 1107 and 1108.

The liquid crystal light valves 1210, 1220, and 1230 are opposed to incident faces of color light of the cross-dichroic prism 1206, respectively. The color light input to the liquid crystal light valves 1210, 1220, and 1230 is modulated on the basis of video information (video signals), and is emitted to the cross-dichroic prism 1206.

The prism is formed by bonding four rectangular prisms, in which a dielectric multilayer film reflecting the red light and a dielectric multilayer film reflecting the blue light are formed on an inner face thereof in a cross-shape. Three colors of light are synthesized by such dielectric multilayer films, and the beams of light representing color images are synthesized. The synthesized light is projected onto the screen 1300 by the projection lens 1207 that is the projection optical system, and the image is enlarged and displayed.

The liquid crystal device 100 described above is applied to the liquid crystal light valve 1210. The liquid crystal device 100 is disposed with a gap between a pair of polarization elements disposed in a cross manner on the incident side and the emission side of the color light. The same is applied to the other liquid crystal light valves 1220 and 1230.

According to such a projection type display apparatus 1000, the liquid crystal device 100 in which the display unevenness or burn-in phenomenon caused by the ionic impurities is reduced is used as the liquid crystal light valves 1210, 1220, and 1230, and thus satisfactory display quality and high reliability are realized.

The invention is not limited to the embodiments described above, and may be appropriately modified within the scope which does not deviate from the main concept or sprit of the invention understood from Claims or the entire specification, and a liquid crystal device 100 with such modification and an electronic apparatus to which the liquid crystal device 100 is applied are included in the technical scope of the invention. In addition to the embodiments described above, various modification examples are conceivable. Hereinafter, the modification examples will be described.

MODIFICATION EXAMPLE 1

The peripheral electrode 141 (the peripheral electrode 161) as the second connection line layer in the liquid crystal device 100 is not limited to disposition to surrounding the pixel area E. FIG. 15 is a schematic plan view illustrating disposition of peripheral electrodes of the modification example. As shown in FIG. 15, by generation of flow based on movement of liquid crystal molecules, corresponding to the corner portions positioned at the diagonal of the pixel area E where the ionic impurities are easily eccentrically located, a pair of peripheral electrode 141A and peripheral electrode 141B may be disposed at the parts taken along the corner portions. In addition, the peripheral electrodes 141A and 141B may be formed in the same layer as the pixel electrode 15 similarly to Example 1 to Example 4, and may be formed in the connection line layer 14 to be electrically connected to the first connection line layer similarly to Example 5 and Example 6.

MODIFICATION EXAMPLE 2

In Example 4 of the liquid crystal device 100, the second peripheral electrode 151, the peripheral electrode 141, and the third peripheral electrode 152 are disposed adjacent to one another from the pixel area E side, between the seal member 40 and the pixel area E in the same layer as the pixel electrode 15. When the display unevenness or burn-in phenomenon shown in FIG. 5 is caused mainly by the ionic impurities included in the seal member 40, a configuration of eliminating the second peripheral electrode 151 of Example 4 may be employed.

MODIFICATION EXAMPLE 3

The alignment process in the liquid crystal device 100 is not limited to the VA (Vertical Alignment) method. For example, even using a TN (Twisted Nematic) method or an OCB (Optically Compensated Bend) method, it is possible to improve the display defect caused by the ionic impurities by applying the peripheral electrode 141 (the peripheral electrode 161).

MODIFICATION EXAMPLE 4

The liquid crystal device 100 to which the peripheral electrode 141 (the peripheral electrode 161) is applied is not limited to the projection type. The invention may be also applied to a reflection type liquid crystal device in which the pixel electrode 15 has light reflectivity.

MODIFICATION EXAMPLE 5

The electronic apparatuses to which the liquid crystal device 100 is applicable are not limited to the projection type display apparatus 1000 of the embodiment. For example, the liquid crystal device 100 may be appropriately used as a projection type HUD (a head-up display) or a direct-view type HMD (a head mount display), or a display unit of an information terminal apparatus such as an electronic book, a personal computer, a digital camera, a liquid crystal TV, a view finder type or monitor direct-view type video recorder, a car navigation system, an electronic diary, and a POS.

This application claims priority from Japanese Patent Application No. 2011-254706 filed in the Japanese Patent Office on Nov. 22, 2011, the entire disclosure of which is hereby incorporated by reference in its entirely.

What is claimed is:

1. A liquid crystal device comprising:
a first substrate that is provided with a pixel area where a plurality of pixel electrodes are arranged on one face side thereof;
a second substrate that is provided with a common electrode to which a common potential is applied;
a seal member that bonds the first substrate and the second substrate; and
a liquid crystal layer that is kept in an area surrounded by the seal member between the first substrate and the second substrate,
wherein the first substrate includes
a base material,
a first connection line that is provided between the base material and the liquid crystal layer, which are between the pixel area and the seal member in a plan view, and the first connection line is configure to be applied a first potential lower than the common potential,
a second connection line that is provided between the first connection line and the liquid crystal layer and is provided to overlap with at least a part of the first connection line in the plan view, and the second connection line is configured to be applied a second potential higher than the common potential, and
a third connection line that is provided between the base material and the liquid crystal layer, is provided adjacent to the pixel electrodes between the second connection line and the pixel electrodes in the plan view, and to which the common potential is applied.

2. A liquid crystal device comprising:
a first substrate that is provided with a pixel area where a plurality of pixel electrodes are arranged on one face side thereof;
a second substrate that is provided with a common electrode to which a common potential is applied;
a seal member that bonds the first substrate and the second substrate; and
a liquid crystal layer that is kept in an area surrounded by the seal member between the first substrate and the second substrate,
wherein the first substrate includes
a base material, a first connection line that is provided between the base material and the liquid crystal layer, which are between the pixel area and the seal member in a plan view, and to which a first potential higher than the common potential is applied,
a second connection line that is provided between the first connection line and the liquid crystal layer and is provided to overlap with at least a part of the first connection line in the plan view, and to which a second potential lower than the common potential is applied, and
a third connection line that is provided between the base material and the liquid crystal layer, is provided adjacent to the pixel electrodes between the second connection line and the pixel electrodes in the plan view, and to which the common potential is applied.

3. The liquid crystal device according to claim 1, wherein the first substrate includes transistors corresponding to the pixel electrodes, scanning lines that are electrically connected to the transistors, and a scanning line driving circuit that supplies a driving signal to the scanning lines, and
wherein the first connection line is a positive potential connection line for supplying a positive potential to the scanning line driving circuit.

4. The liquid crystal device according to claim 1, wherein the third connection line is provided between the first connection line and the second connection line, and is disposed to overlap with at least a part of an area of the first connection line which does not overlap with the second connection line in the plan view.

5. The liquid crystal device according to claim 1, wherein the second connection line is overlapped to cover the first connection line in the plan view.

6. The liquid crystal device according to claim 1, wherein the second connection line is formed in a same layer as the pixel electrode.

7. The liquid crystal device according to claim 6, wherein the second connection line is disposed at a part along at least corner portions of the pixel area.

8. A liquid crystal device comprising:
a first substrate that is provided with a pixel area where a plurality of pixel electrodes are arranged on one face side thereof;
a second substrate that is provided with a common electrode to which a common potential is applied;
a seal member that bonds the first substrate and the second substrate; and
a liquid crystal layer that is kept in an area surrounded by the seal member between the first substrate and the second substrate,
wherein the first substrate includes
a base material,
a first connection line that is provided between the base material and the liquid crystal layer, which are between the pixel area and the seal member in a plan view, and the first connection line is configure to be applied a first potential lower than the common potential,
a second connection line that is provided between the first connection line and the liquid crystal layer, is provided to overlap with at least a part of the first connection line in the plan view, is formed in a same layer as the pixel electrode, and the second connection line is configured to be applied a second potential higher than the common potential, and a fourth connection line to which the common potential is applied, between the second connection line and the pixel electrode in the plan view in the same layer as the pixel electrodes.

9. A liquid crystal device comprising:
a first substrate that is provided with a pixel area where a plurality of pixel electrodes are arranged on one face side thereof;
a second substrate that is provided with a common electrode to which a common potential is applied;
a seal member that bonds the first substrate and the second substrate; and
a liquid crystal layer that is kept in an area surrounded by the seal member between the first substrate and the second substrate,
wherein the first substrate includes
a base material,
a first connection line that is provided between the base material and the liquid crystal layer, which are between the pixel area and the seal member in a plan view, and the first connection line is configure to be applied a first potential lower than the common potential,
a second connection line that is provided between the first connection line and the liquid crystal layer, is provided to overlap with at least a part of the first connection line in the plan view, is formed in a same layer as the pixel electrode, and the second connection line is configured to be applied a second potential higher than the common potential, and
a fifth connection line to which the common potential is applied, between the second connection line and the seal member in the plan view in the same layer as the pixel electrodes.

10. A liquid crystal device comprising:
a first substrate that is provided with a pixel area where a plurality of pixel electrodes are arranged on one face side thereof;
a second substrate that is provided with a common electrode to which a common potential is applied;
a seal member that bonds the first substrate and the second substrate; and
a liquid crystal layer that is kept in an area surrounded by the seal member between the first substrate and the second substrate,
wherein the first substrate includes
a base material,
a first connection line that is provided between the base material and the liquid crystal layer, which are between the pixel area and the seal member in a plan view, and the first connection line is configure to be applied a first potential lower than the common potential,
a second connection line that is provided between the first connection line and the liquid crystal layer, is provided to overlap with at least a part of the first connection line in the plan view, is formed in a same layer as the pixel electrode, and the second connection line is configured to be applied a second potential higher than the common potential, and a fourth connection line to which the common potential is applied, between the second connection line and the pixel electrode in the plan view, and a fifth connection line to which the common potential is applied, between the second connection line and the seal member in the plan view, in the same layer as the pixel electrodes.

11. The liquid crystal device according to claim 1, wherein the second potential is equal to or lower than a potential in which a ratio of change is 50% when a ratio of change of transmittance at the ON-OFF time in the liquid crystal layer is 100% considering the common potential as a reference potential.

12. The liquid crystal device according to claim 1, wherein the second potential is equal to or lower than a potential in which a ratio of change is 10% when a ratio of change of transmittance at the ON-OFF time in the liquid crystal layer is 100% considering the common potential as a reference potential.

13. A liquid crystal device comprising:
a first substrate that is provided with a pixel area where a plurality of pixel electrodes are arranged on one face side thereof;
a second substrate that is provided with a common electrode to which a common potential is applied;
a seal member that bonds the first substrate and the second substrate; and
a liquid crystal layer that is kept in an area surrounded by the seal member between the first substrate and the second substrate,
wherein the first substrate includes
a first connection line that is provided between the base material of the first substrate and the liquid crystal layer, which are between the pixel area and the seal member in a plan view, and to which a first potential lower than the common potential is applied,
a second connection line that is provided between the first connection line and the liquid crystal layer and is provided to overlap with at least a part of the first connection line in the plan view, and is electrically connected to the first connection line, and
a third connection line that is provided between the base material and the liquid crystal layer, is provided adjacent to the pixel electrodes between the second connection line and the pixel electrodes in the plan view, and to which the common potential is applied.

14. The liquid crystal device according to claim 13, wherein the first substrate includes transistors corresponding to the pixel electrodes, scanning lines that are electrically connected to the transistors, and a scanning line driving circuit that supplies a driving signal to the scanning lines, and the first connection line is a positive potential connection line for supplying a positive potential to the scanning line driving circuit.

15. An electronic apparatus comprising the liquid crystal device according to claim 1.

16. An electronic apparatus comprising the liquid crystal device according to claim 2.

17. An electronic apparatus comprising the liquid crystal device according to claim 3.

18. An electronic apparatus comprising the liquid crystal device according to claim 4.

* * * * *